United States Patent
Ikeda et al.

(10) Patent No.: US 9,553,308 B2
(45) Date of Patent: Jan. 24, 2017

(54) NEGATIVE ELECTRODE MATERIAL FOR SODIUM SECONDARY BATTERY AND METHOD FOR PRODUCING SAME, NEGATIVE ELECTRODE FOR SODIUM SECONDARY BATTER, AND SODIUM SECONDARY BATTERY

(71) Applicants: Isuzu Glass Co., Ltd., Osaka (JP); National Institute of Advanced Industrial Science and Technology, Tokyo (JP)

(72) Inventors: Koichiro Ikeda, Osaka (JP); Yuta Ikeuchi, Osaka (JP); Takashi Mukai, Osaka (JP); Tetsuo Sakai, Osaka (JP); Taichi Sakamoto, Osaka (JP); Kunihiko Tani, Osaka (JP); Kiichiro Yamaguchi, Osaka (JP); Naoto Yamashita, Osaka (JP)

(73) Assignees: ISUZU GLASS CO., LTD., Osaka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 267 days.

(21) Appl. No.: 14/355,252

(22) PCT Filed: Nov. 1, 2012

(86) PCT No.: PCT/JP2012/078329
§ 371 (c)(1),
(2) Date: Apr. 30, 2014

(87) PCT Pub. No.: WO2013/065787
PCT Pub. Date: May 10, 2013

(65) Prior Publication Data
US 2015/0280220 A1 Oct. 1, 2015

(30) Foreign Application Priority Data
Nov. 2, 2011 (JP) .................................. 2011-241539

(51) Int. Cl.
| | |
|---|---|
| *H01M 4/13* | (2010.01) |
| *H01M 4/58* | (2010.01) |
| *H01M 4/62* | (2006.01) |
| *H01M 6/16* | (2006.01) |
| *H01M 4/48* | (2010.01) |
| *H01M 4/36* | (2006.01) |
| *H01M 4/136* | (2010.01) |
| *H01M 10/054* | (2010.01) |
| *H01M 10/0568* | (2010.01) |
| *H01M 10/0569* | (2010.01) |
| *H01M 4/1397* | (2010.01) |

(Continued)

(52) U.S. Cl.
CPC ............. *H01M 4/366* (2013.01); *H01M 4/136* (2013.01); *H01M 4/1397* (2013.01); *H01M 4/38* (2013.01); *H01M 4/5815* (2013.01); *H01M 4/622* (2013.01); *H01M 4/624* (2013.01); *H01M 10/054* (2013.01); *H01M 10/0568* (2013.01); *H01M 10/0569* (2013.01); *H01M 2004/027* (2013.01); *H01M 2300/0028* (2013.01); *H01M 2300/0037* (2013.01); *Y02E 60/122* (2013.01); *Y02P 70/54* (2015.11)

(58) Field of Classification Search
CPC .... H01M 4/362; H01M 4/0402; H01M 4/136; H01M 4/1397; H01M 4/5815; H01M 2300/0034
USPC ............................................ 429/231.1, 231.9
See application file for complete search history.

(56) References Cited

U.S. PATENT DOCUMENTS

| | | | | |
|---|---|---|---|---|
| 6,991,662 B2 * | 1/2006 | Visco | ...................... | H01M 4/04 29/623.4 |
| 8,586,245 B2 * | 11/2013 | Yamaguchi | ............. | H01M 4/38 429/218.1 |

(Continued)

FOREIGN PATENT DOCUMENTS

| | | |
|---|---|---|
| EP | 1482582 A2 | 12/2004 |
| JP | S5873968 A | 5/1983 |

(Continued)

OTHER PUBLICATIONS

Chinese Office Action with Translation, Application No. 201280053204.0, dated Nov. 4, 2015.

(Continued)

*Primary Examiner* — Patrick Ryan
*Assistant Examiner* — Julian Anthony
(74) *Attorney, Agent, or Firm* — The Dobrusin Law Firm, P.C.

(57) ABSTRACT

Problem. Provided is a negative electrode material for a sodium secondary battery and its manufacturing method, and a negative electrode for a sodium secondary battery, and a sodium secondary battery, wherein the negative electrode material can have excellent cycle characteristics while maintaining high discharge capacity. Solution. A negative electrode material for a sodium secondary battery according to the present invention includes sulfide or sulfide composite body containing sulfur and antimony, and as necessary further includes the following component(s) of (i): (i) at least one or more element(s) selected from a group consisting of Sn, As, Bi, Ge, Ga, Pb, and C, wherein when a component(s) of (i) is included, the ratio of each of the above described components is sulfur: 10 to 70 mol %, antimony: 10 to 70 mol %, and (i): 3 to 60 mol %.

20 Claims, 25 Drawing Sheets

(51) Int. Cl.
*H01M 4/38* (2006.01)
*H01M 4/02* (2006.01)

(56) References Cited

U.S. PATENT DOCUMENTS

2012/0264019 A1* 10/2012 Saka ............... C01B 25/45
429/221
2013/0035820 A1 2/2013 Kawasaki et al.

FOREIGN PATENT DOCUMENTS

| JP | H03-155062 A | 7/1991 |
| JP | 2003-59492 A | 2/2003 |
| JP | 2003-077461 A | 3/2003 |
| JP | 2006-244976 A | 9/2006 |
| JP | 2008-004461 A | 1/2008 |
| JP | 2008-103282 A | 5/2008 |
| JP | 2011-134551 A | 7/2011 |
| JP | 2011-241539 A | 12/2011 |
| WO | 2010/109889 A1 | 9/2010 |
| WO | 2011/078195 A1 | 6/2011 |
| WO | 2011/078197 A1 | 6/2011 |

OTHER PUBLICATIONS

International Search Report, PCT/JP2012/078329, dated Jan. 8, 2013.
International Written Opinion, PCT/JP2012/078329, dated Jan. 8, 2013.
International Preliminary Report on Patentability, PCT/JP2012/078329, dated May 2, 2014.
Mukai, Takashi et al., 3D32 Sodium Ion Denchi-yo Sn-Sb-kei Ryukabutsu Fukyoku no Kenkyu Kaihatsu, Abstracts of the $79^{th}$ Annual Meeting of the Electrochemical Society of Japan, Mar. 29, 2012, p. 138.
Kataoka, Riki et al., Development of high capacity positive electrode material for sodium ion battery, Pacific Rim Meeting on Electrochemical and Solid-State Science 2012 (Prime 2012), Oct. 7, 2012, Abstract 1841.
Mukai, Takashi et al., "1C04 Sn-Sb-kei Iou Glass Fukyoku o Mochiita Li Ion Niji Denchi Tokusei", the $52^{nd}$ Battery Symposium in Japan Koen Yoshishu, Oct. 17, 2011 (Oct. 17, 2011), p. 181.
Senguttuvan, et al., $Na_2Ti_3O_7$: Lowest Voltage Ever Reported Oxide Insertion Electrode for Sodium Ion Batteries, Chemistr of Materials, Aug. 30, 2011, vol. 23, pp. 4108-4111.
Extended European Search Report, Application No. EP12845609.2 dated Oct. 2, 2015.
Jong-Seon Kim et al. "The Additional of Iron to NiSelectrode for Sodium Secondary Battery" vol. 11, No. 1 dated Nov. 26, 2010.
Yamashita N et al. "Development of Tin-antimony Sulfide Glass Anode and Their Li Ion Battery Performance" vol. 52, dated Oct. 17, 2011.
Korean Office Action with Translation, Application No. 10-2014-7013830 Dated Nov. 17, 2015.
Yamashita et al. "The substance of lectures for the 52nd battery debate", 1C04, p. 108 (2011) Publication date: Oct. 17, 2011.
Mukai et al. The substance of lectures for the 79th battery debate, 3D32, p. 138 (2012) Publication date: Mar. 29, 2012.
Yamashita et al. The substance of lectures for the 53rd battery debate, 1D29, p. 227 (2012) Publication date: Nov. 14, 2012.

* cited by examiner

NEGATIVE ELECTRODE MATERIAL FOR SODIUM SECONDARY BATTERY AND METHOD FOR PRODUCING SAME, NEGATIVE ELECTRODE FOR SODIUM SECONDARY BATTER, AND SODIUM SECONDARY BATTERY

CLAIM OF PRIORITY

This application is a 371 of international PCT/JP2012/078329, filed on Nov. 1, 2012, which claims benefit to Japanese serial number 2011-241539 filed on Nov. 2, 2011, which are both incorporated by reference in their entirety for all purposes.

TECHNICAL FIELD

The present invention relates to a negative electrode material for a sodium secondary battery and its manufacturing method, and a negative electrode for a sodium secondary battery, and a sodium secondary battery.

BACKGROUND OF THE INVENTION

Lithium secondary batteries such as lithium ion batteries and lithium polymer batteries not only have high voltage and high capacity but also are light in weight compared to nickel cadmium batteries and nickel hydrogen batteries. In recent years, therefore, they are more widely used as main power sources for mobile communication equipment, portable electronic devices, electric bicycles, electric two-wheel vehicles, electric automobiles, etc. For example, generally, in current lithium ion batteries, as a positive electrode, lithium-containing transition metal compound oxide such as lithium cobalt oxide ($LiCoO_2$), lithium nickel oxide ($LiNiO_2$) and lithium iron phosphate ($LiFePO_4$) is used, and as a negative electrode, graphite, hard carbon or the like which is capable of absorbing and releasing lithium is used. In addition, as an electrolyte used in a lithium ion battery, a solution, in which an electrolytic salt is dissolved in a mixed organic solvent, is mainly used, wherein cyclic carbonate such as propylene carbonate (PC) and ethylene carbonate (EC), and chain carbonate such as dimethyl carbonate (DMC), diethyl carbonate (DEC) and methylethyl carbonate (MEC) are mixed in the mixed organic solvent, and wherein lithium tetrafluoroborate ($LiBF_4$), lithium hexafluorophosphate ($LiPF_6$), lithium hexafluoroarsenate ($LiAsF_6$), lithium perchlorate ($LiClO_4$), lithium bis (trifluoromethanesulfonyl) imide ($LiN(CF_3SO_2)_2$), lithium trifluoromethanesulfonate ($LiCF_3SO_3$) or the like is used as the electrolytic salt.

As a major problem of current lithium ion batteries, there is given an uneven regional distribution of lithium resource. In view of this actual situation, the research of nonaqueous electrolyte secondary battery using sodium ion instead of lithium ion has been undertaken in recent years. Sodium is an element which is abundant in seawater and is the sixth most abundant element on earth, and therefore it is cheap and easy to obtain. That is, from the view point of the recent movement of not using rare earth elements, sodium is a very attractive element. In addition, as a power collector of negative electrode, a copper foil is used in a lithium ion battery; on the other hand, an aluminum foil which is cheap can be used in a sodium ion battery, which is an advantage over the lithium ion battery. Further, sodium is an alkali metal element to which lithium also belongs to, and thus it has similar characteristics to those of lithium. Accordingly, theory of sodium ion battery itself has been studied long before.

However, a sodium ion battery has a major problem. For example, a lithium ion battery causes intercalation phenomenon for charge and discharge, wherein lithium ion moves between graphite of a negative electrode active substance and lithium-containing transition metal compound oxide such as $LiCoO_2$ of a positive electrode active substance, and moves between molecules of each material. Since graphite has a layered molecule structure, the structure of the graphite is rarely destroyed even if lithium ion moves in and out between layers. In addition, a lithium ion battery theoretically can absorb a capacity of 327 mAh/g of lithium ion. However, sodium ion has a large radius, and thus cannot enter between layers of molecules of graphite. Accordingly, a sodium ion battery does not show any capacity.

Patent Document 1 discloses an invention of a secondary battery using an alkali metal as negative electrode material. Specifically, it describes using a lithium metal as alkali metal. For example, if sodium metal (Na) as alkali metal is used as a negative electrode material, a high capacity can be theoretically achieved. However, when sodium metal (Na) is used as a negative electrode material, dendrites are precipitated on the negative electrode during charge, and after repeated charge and discharge they reach the positive electrode side, thus causing a phenomenon of internal short circuit. Furthermore, since precipitated dendrites have a high lability due to their large specific surface area, and interfacial membranes including solvent degradation products without electron conductivity are formed on the surface, the charge and discharge efficiency is lowered due to the high internal resistance of the battery. For these reasons, a sodium ion battery using sodium metal has disadvantages of low reliability and short cycle life.

From this background, a negative electrode material including other material than sodium metal and causing no internal short circuit has been desired in a sodium ion secondary battery. Patent Document 2 describes an invention relating to a sodium ion secondary battery using fibrous carbon material having a diameter of 0.1 µm to 1.0 µm as a negative electrode. When the fibrous carbon material described in Patent Document 2 is used as a negative electrode, the cycle life thereof is good. However, there exists a problem of low energy density.

Patent Document 3 concerning electrolyte describes that propylene carbonate or a mixed solvent of propylene carbonate and ethylene carbonate is preferably used as a solvent for electrolyte used for a hard carbon negative electrode in a sodium ion secondary battery. Non Patent Document 1 shows that a hard carbon electrode utilizing EC:DMC-based electrolyte commonly used in lithium ion batteries could not obtain good cycle characteristics in a sodium cell, and reports that better cycle characteristics are obtained from PC-based electrolyte than EC:DMC-based and PC:DMC-based electrolytes. In other words, Patent Document 3 and Non Patent Document 1 show that the cycle characteristics of negative electrode are largely dependent on electrolyte. Patent Document 4 discloses an example in which sodium ion is contained in nonaqueous electrolyte in a nonaqueous electrolyte secondary battery which includes a simple substance of Sn or Ge as a negative electrode.

However, Patent Document 3 and Non Patent Document 1 only studied a case of electrolyte used for a hard carbon negative electrode, and did not study a case of electrolyte used for an alloy-based negative electrode.

The negative electrode including a simple substance of Sn or Ge described in Patent Document 4 causes large volume expansion/contraction due to absorption/release of sodium at the time of charging/discharging. As a result, there is a problem that the electrode itself may fall apart, and thus the cycle life thereof is poor. In addition, Patent Document 4 did not study an electrolyte.

THE PRIOR ART DOCUMENT

Patent Document

Patent Document 1: Japanese Patent Publication No. S58-73968
Patent Document 2: Japanese Patent Publication No. H3-155062
Patent Document 3: WO 2010/109889 A1
Patent Document 4: Japanese Patent Publication No. 2006-244976

Non Patent Document

Non Patent Document 1: Wataru Murata at al, hard carbon for sodium ion battery, 50th battery debate, 1D05, pp. 233, issued on Nov. 30, 2009

SUMMARY OF THE INVENTION

Problem(s) to be Solved by the Invention

The present invention has been made in consideration of the above situation of the prior art and has its principal object to provide a negative electrode material for a sodium secondary battery and its manufacturing method, and a negative electrode for a sodium secondary battery, and a sodium secondary battery, wherein the negative electrode material can have excellent cycle characteristics while maintaining high discharge capacity.

Means for Solving the Problem(s)

A negative electrode material for a sodium secondary battery according to the present invention includes sulfide or sulfide composite body containing sulfur and antimony. Further, the negative electrode material for a sodium secondary battery includes the following component(s) of (i) as necessary:
(i) at least one or more element(s) selected from a group consisting of Sn, As, Bi, Ge, Ga, Pb, and C, wherein when a component(s) of (i) is included, the ratio of each of the above described components is sulfur 10 to 70 mol %, antimony: 10 to 70 mol %, and (i): 3 to 60 mol %.
Herein, "composite body" means the one composed of particles with their components being coupled to each other, and its concept is different from "mixed body" which is composed of particles containing components merely being mixed. Specifically, a sulfide composite body includes sulfide glass, crystallized sulfide, sulfide solid solution such as sulfide amorphous body, sulfide coated body (non-sulfide has its part or all covered with sulfide), sulfide sintered body and the like.

A negative electrode material for a sodium secondary battery according to the present invention can function as a negative electrode active substance which can obtain high capacity and excellent cycle life.

The above described sulfide composite body preferably includes 0.5 to 40 mol % of Ge. Because Ge serves to form a glass framework, a vitrified negative electrode material can be obtained. By vitrifying, the vitrified negative electrode material has water- and acid-resistant properties, and it does not react easily with water or oxygen. Therefore, the ionic conductivity is never reduced, and the vitrified negative electrode material is easy to deal with. In addition, since a water-based binder can be used together, each manufacturing step does not have to be arranged under a dry atmosphere, and the manufacturing costs can be reduced. That is, vitrification is preferable.

A negative electrode material for a sodium secondary battery according to the present invention may be a composite powder of the following component A and component B: (1) component A is a material capable of electrochemically absorbing and releasing sodium; and (2) component B is the above described sulfide or sulfide composite body. The concept of "composite powder" used herein is different from that of "mixed powder", and while a mixed powder is a mere mixture of the powder that is component A and the powder that is component B, a composite powder includes both component A and component B in each one of the particles making up the powder. In other words, component A and component B are coupled to each other (integrated) to make a composite powder, and the composite powder includes a form of component A being covered or supported by component B (or vice versa), for example.

The above described composite powder is preferably a composite powder with the surface of component A coated with component B. Because with the existence of component B around (on the surface of) component A, the ionic conductivity of component A can be enhanced during absorption and release (charge and discharge) of sodium. In addition, cracks caused by expansion and contraction can be controlled. Consequently, since an active substance, which with only component A has poor ionic conductivity and poor cycle life, can enhance the ionic conductivity and cycle characteristics, even an active substance with poor conductive properties or with high capacity (large volume expansion) improves its cycle life characteristics.

Regarding a ratio of component A and component B of the above described entire composite powder, component A is preferably 40 to 95 mass % and component B is preferably 60 to 5 mass %, given that a total amount of both is 100 mass %. The ratio of component A and component B is adjusted within the above described range so as to obtain a long-life-type negative electrode with highly excellent cycle life characteristics or a high-capacity-type negative electrode with very high capacity per weight of an active substance. Further, component A and component B may exist as the main component phase in the above described composite powder, and a very small amount of impurities may exist. The very small amount of impurities does not adversely affect the cycle.

A negative electrode for a sodium secondary battery according to the present invention is a negative electrode for a sodium secondary battery using the above described negative electrode material for a sodium secondary battery. Accordingly, the negative electrode for a sodium second battery has a long life and high charge/discharge capacity, and it is also easy to handle with.

The negative electrode for a sodium secondary battery according to the present invention preferably includes a polyimide binder. By using a polyimide binder, the binding by the binder can be maintained even if the volume expansion is large during charge and discharge. When a sulfide composite body is vitrified, its negative electrode material is water-resistant, and thus a water-based binder may be used.

A sodium secondary battery according to the present invention is a sodium secondary battery using the above described negative electrode for a sodium secondary battery. A manufacturing method of the negative electrode material for a sodium secondary battery according to the present invention includes the steps: (A) obtaining component B by preparing a material of component B and by making a solid solution of the prepared material through heat treatment (temperature: 400 to 1100° C. and treatment time: 1 to 30 hours); and (B) making a composite of component A and component B. According to this method, solid-solutioned component B is obtained during step (A), and solid-solutioned component B and component A make a composite during step (B). Thereby, a negative electrode for a sodium secondary battery having a long life and high charge/discharge capacity as well as easy to handle with can be obtained.

The above described step (B) is preferably a step of making a composite of component A and component B through mechanical milling. Since component B has low mechanical strength compared to component A, component B is easier to be crushed than component A. Therefore, the microparticulated powder of component B is pressure-bonded on the powder surface of component A by means of a ball, etc. so as to coat component A with component B.

The above described step (B) may be a step of dispersing component A in melted component B and crushing it after cooling. If the amount of component B is smaller than that of component A, it is difficult to coat component A with component B, but the method of dispersing component A in melted component B and then crushing it after cooling can be adapted so as to certainly coat component A with component B.

It is preferable that a conductive aid and/or binder is added during the above described step (A) and/or step (B) and thus the conductive aid and/or binder is included in the composite powder. By including a conductive aid in the composite powder, the conductivity of a negative electrode for a sodium secondary electrode to be obtained can be improved, and the cycle life characteristics and the high rate discharge characteristics of the battery can be improved.

A battery using the negative electrode according to the present invention is preferably a sodium secondary battery, in which an electrolyte has an $NaPF_5$ dissolved in a mixed solvent, and the mixed solvent includes a main solvent containing ethylene carbonate (EC) and a sub solvent containing one or more solution(s) selected from propylene carbonate (PC), ethyl methyl carbonate (EMC), dimethyl carbonate (DMC), and diethyl carbonate (DEC). The EC-containing solvent is used as the electrolyte solvent, thereby enhancing the effect of improving the cycle life of the negative electrode. In general, EC, which is a solid at normal temperature, does not function as electrolyte by itself. However, when EC is mixed with one or more solution(s) selected from propylene carbonate (PC), ethyl methyl carbonate (EMC), dimethyl carbonate (DMC), and diethyl carbonate (DEC) to make a mixed solvent, it functions as usable electrolyte even at normal temperature. When $NaPF_6$ is used as electrolytic salt, effect of improving the cycle life of the negative electrode is enhanced. In addition, the concentration of the electrolyte (concentration of the salt in a solvent) is not particularly limited, but it is preferably 0.1 to 3 mol/L, and more preferably 0.5 to 2 mol/L.

Effect of the Invention

According to the present invention, it is possible to provide a negative electrode material for a sodium secondary battery and its manufacturing method, and a negative electrode for a sodium secondary battery, and a sodium secondary battery, wherein the negative electrode material can have excellent cycle characteristics while maintaining high discharge capacity.

DETAILED DESCRIPTION OF THE INVENTION

Hereinafter, embodiments of a negative electrode material for a sodium secondary battery and its manufacturing method, and a negative electrode for a sodium secondary battery, and a sodium secondary battery according to the present invention will be described. A negative electrode material for a sodium secondary battery (sodium ion secondary battery) according to the present invention includes sulfide or sulfide composite body containing sulfur and antimony. Further, the negative electrode material for a sodium secondary battery may include the following component(s) of (i) as necessary: (i) at least one or more element(s) selected from a group consisting of Sn, As, Bi, Ge, Ga, Pb, and C, wherein when a component(s) of (i) is included, the ratio of each of the above described components is sulfur: 10 to 70 mol %, antimony: 10 to 70 mol %, and (i): 3 to 60 mol %.

In other words, sulfide and antimony are indispensable components for the negative electrode material for a sodium secondary battery according to the present invention, and the above described components of (i) are optional components which can be added as necessary. When the component(s) of (i) is not included, the ratio of sulfur and antimony is sulfur: 40 to 75 mol % and antimony: 25 to 60 mol %.

The above described sulfide or sulfide composite body (hereinafter, referred to as "sulfide, etc.") changes into at least sodium sulfide ($Na_2S$) during the process of initial charge (sodium ion absorption) and does not react during subsequent processes of charge and discharge. That is, it is reduced by sodium and decomposed into at least a solid electrolyte layer. For example, SnO forms sodium oxide ($Na_2O$) which is a solid electrolyte during the process of initial charge. However, since sodium oxide has poor ionic conductivity, its cycle life characteristics are poor. On the other hand, the above described sulfide, etc. are decomposed into a sodium sulfide ($Na_2S$)-based solid electrolyte during the process of initial charge. A sodium sulfide ($Na_2S$)-based solid electrolyte layer is a solid body that can transport sodium ion during the process of absorption and release of sodium ion. Thus, when a negative electrode material for a sodium secondary battery according to the present invention is decomposed into a sodium sulfide ($Na_2S$)-based solid electrolyte during the process of initial charge so as to have good ionic conductivity, it has good cycle life characteristics even with high capacity.

Figure 25:
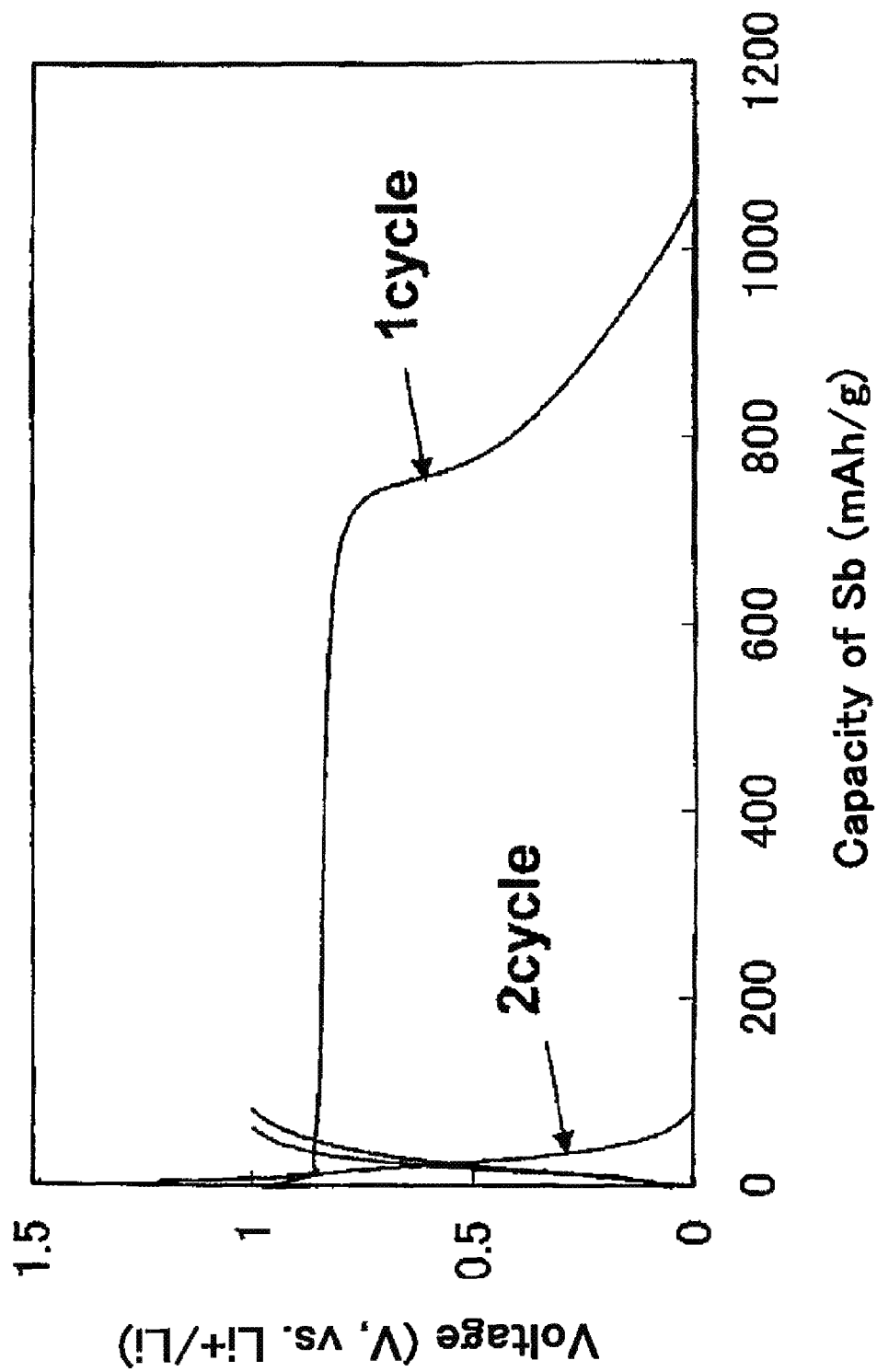
FIG. 25 is a graph of the charge and discharge curve when antimony is used as a negative electrode active substance in a lithium ion secondary battery.

In the components of the sulfide, etc. constituting the negative electrode material for a sodium secondary battery according to the present invention, sulfur is an indispensable element for forming sodium sulfide during initial charge, and antimony serves to absorb and release sodium in a reversible manner as well as enhancing the cycle life characteristics of the negative electrode material, of which reason is not certain. (i) serves to absorb and release a large amount of sodium in a reversible manner. It is noted that antimony is not a negative electrode active substance in a lithium secondary battery. According to an experiment conducted by the present inventors, antimony absorbs lithium at a capacity exceeding 1000 mAh/g during first cycle, as shown in FIG. 25; however, it does not function as a negative electrode active substance in a voltage range of 0 to 1V (vs. $Li^+/Li$). As can be seen from this, it can be explicitly said that an idea of using antimony as a negative electrode active substance cannot be easily conceived.

Sulfur is 10 to 70 mol % not only because if it is less than 10 mol %, an electrode with reduced amount of a sodium sulfide-based solid electrolyte that can be formed and with poor ionic conductivity or an electrode with reduced amount of a buffer layer absorbing volume expansion of (i) during charge and discharge and with poor cycle life characteristics will be formed, but also because if it is more than 70 mol %, an electrode with low negative electrode capacity due to reduced amount of antimony and (i) will be formed, neither of which is preferable. Sulfur is more preferably 20 to 65 mol % and even more preferably 30 to 60 mol %. Antimony is 10 to 70 mol % not only because if it is less than 10 mol %, an electrode with low negative electrode capacity and with poor cycle life characteristics will be formed, but also because if it is more than 70 mol %, an electrode with reduced amount of a sodium sulfide-based solid electrolyte that can be formed and with poor ionic conductivity or an electrode with reduced amount of a buffer layer absorbing volume expansion of (i) during charge and discharge and with poor cycle life characteristics will be formed due to reduced amount of sulfur, neither of which is preferable. Antimony is more preferably 20 to 65 mol % and even more preferably 30 to 60 mol %. (i) is 3 to 60 mol % not only because if it is less than 3 mol %, an electrode with low negative electrode capacity will be formed, but also because if it is more than 60 mol %, an electrode with reduced amount of a sodium sulfide-based solid electrolyte that can be formed and with poor ionic conductivity or an electrode with reduced amount of a buffer layer absorbing volume expansion of (i) during charge and discharge and with poor cycle life characteristics and also with reduced amount of antimony with poor cycle life characteristics will be formed due to reduced amount of sulfur, neither of which is preferable. (i) is more preferably 20 to 55 mol % and even more preferably 30 to 50 mol %.

The sulfide, etc. constituting the negative electrode material for a sodium secondary battery according to the present invention is preferably vitrified. The sulfide, etc. can include Ge so as to be vitrified. Ge serves to form the glass framework. The content of Ge is preferably 0.5 to 40 mol % and more preferably 1 to 20 mol %. If the content of Ge is less than 0.5 mol %, vitrification is likely to be insufficient. If it is more than 40 mol %, an electrode will be formed having poor cycle life characteristics because of a reduced amount of antimony and having low negative electrode capacity because of a reduced amount of (i). This electrode will be costly because Ge is an expensive element. Therefore, neither case is preferable.

It is noted that the above described sulfide composite body includes a composite of two or more kinds of sulfides.

A manufacturing method of the sulfide composite body constituting the negative electrode material for a sodium secondary battery according to the present invention is not particularly limited, but for example the sulfide composite body can be manufactured by sealing a specified amount of the material of each component in a quartz ample and vitrifying the sealed content through heat treatment. As the material, in addition to the indispensable components of sulfur (S) and antimony (Sb), a single metal such as Sn, Bi, Ge, Ga, Sn, and Pb, or a sulfide of any of these elements, or a nonmetal such as As and C (hard carbon, etc) can be used as an optional component(s) (i) as necessary.

When the sulfide composite body (sulfide glass) is manufactured by the above described manufacturing method, preferably the inside of the quartz ample used is sufficiently dried using a vacuum dryer. Furthermore, during vitrification, it is heated preferably at 400 to 1100° C. and more preferably at 600 to 800° C. The heat treatment time may be long enough to vitrify the content sealed in the quartz ample and generally it is preferably 1 to 30 hours and more preferably 5 to 24 hours. The above described content can be sufficiently vitrified by heating at 400 to 1100° C. for 1 to 30 hours.

When the sulfide, etc. constituting the negative electrode material for a sodium secondary battery according to the present invention is vitrified, the handling of the sulfide, etc.

in the air and the use of a water-based binder, which were impossible with conventional sulfides, are possible since the sulfide, etc. have excellent water-resistant properties.

Furthermore, the sulfide, etc. having the above described composition can improve conductive properties by formation of conductive coating with a conductive metal, carbon etc. This enables the sulfide, etc. to more improve its battery properties as a negative electrode active substance for a sodium battery. As a method of forming the coating of a conductive metal, carbon or the like on the sulfide, etc., known art such as the sputtering method, deposition method, mechanical alloy (MA) method, rotary kiln method, and non-electrolytic plating method can be used.

Too small amount of the conductive coating causes the coating not to be effective enough to improve conductive properties; and on the other hand, an excessive amount of the coating is not preferable because almost all the surface of the sulfide, etc. will be coated, rendering absorption and release of sodium ion difficult. Therefore, the amount of the conductive coating is preferably about 0.1 to 30 weight parts per 100 weight parts of the sulfide, etc., more preferably about 0.5 to 25 weight parts and even more preferably about 1 to 10 weight parts.

Particularly, the method of forming the coating of carbon by mixing the above described sulfide, etc. with a carbon precursor and then by heating it under a non-oxidizing atmosphere is advantageous in that the coating of carbon with excellent uniformity can be easily formed without using a large scale apparatus. A carbon precursor used in this method may be an organic material that can be carbonized by heating, and for example a hydrocarbon-based organic substance with adhesive properties, coal-based pitch, petroleum-based pitch and other substance can be used. Among them, there are given as examples a hydrocarbon-based organic substance with adhesive properties, phenol resin, furan resin, citric acid, PVA, urushiol and the like. One of these carbon precursors can be used singly or two or more of them can be mixed.

The heating temperature can be high enough to carbonize a carbon precursor, and for example it is preferably around 300 to 1100° C. and more preferably 500 to 900° C. In this case, too low heating temperature (less than 300° C.) makes it difficult for a carbon precursor to be carbonized; and on the other hand, too high heating temperature (more than 1100° C.) is not preferable not only because carbon sulfide, etc. could be generated due to reaction of the sulfide, etc. with carbon but also because it is costly due to use of a large scale apparatus. The heat treatment time may be long enough to carbonize a carbon precursor, and generally it may be about 1 to 24 hours. Too short heating time is not preferable because a negative electrode with poor electronic conductivity is obtained due to insufficient carbonization of a carbon precursor. On the other hand, too long heating time is not economically preferable due to waste of heating time. The atmosphere for carbonization treatment may be a non-oxidizing atmosphere such as inert atmosphere and reductive atmosphere. Specifically, it may be an atmosphere of He (helium), Ne (neon), Ar (argon), $N_2$ (nitrogen), $H_2$ (hydrogen) or the like.

Both the above described sulfide, etc. and this sulfide, etc. with the conductive coating formed on it can be used effectively as a negative electrode active substance for a sodium secondary battery.

The negative electrode material for a sodium secondary battery according to the present invention may include only the above described sulfide, etc., but preferably it is a composite powder of a material capable of electrochemically absorbing and releasing sodium (hereinafter referred to as "component A") and the above described sulfide, etc. (hereinafter referred to as "component B"). By using this kind of composite powder as a negative electrode material for a sodium secondary battery, even higher capacity can be achieved.

When the composite powder of component A and component B is used as the negative electrode material for a sodium secondary battery according to the present invention, it can be manufactured by a manufacturing method including the following step (A) and step (B):

(A) a step of preparing the material of component B and obtaining component B by making a solid solution of the prepared material through heat treatment (temperature: 400 to 1100° C. and treatment time: 1 to 30 hours); and (B) a step of making a composite of component A and component B.

Regarding the above step (A) and step (B), the above described manufacturing method of the sulfide composite body can be used as step (A), for example. As step (B), a step of making a composite of component A and component B through mechanical milling, a step of dispersing component A in melted component B and crushing it after cooling or other step can be used. These steps (B) are described later in detail.

Component A is not particularly limited so long as it can absorb sodium ion during initial charge and can absorb and release sodium ion during subsequent cycles of charge and discharge. For example, it may be at least one or more element(s) selected from a group consisting of C, Mg, P, Ca, Sc, V, Cr, Mn, Fe, Co, Zn, Ga, Ge, Y, Zr, Nb, Mo, Pd, Ag, Cd, In, Sn, Sb, W, Pb, and Bi, an alloy, an oxide, chalcogen compound or halogen compound using any of these elements. Among these elements, at least one or more element (s) selected from a group consisting of C, Mg, Ti, Zn, Ge, Ag, In, Sn, and Pb, an alloy, an oxide, chalcogen compound or halogen compound using any of these elements are preferable in that the discharge plateau range can include the range of 0 to 1 V (vs. $Na^+/Na$). Furthermore, in terms of energy density, Zn, Ge, Ag, Sn, Bi, etc. are preferable as elements, a combination of Al—Ge, Si—Ge, Si—Sn, Zn—Sn, Ge—Ag, Ge—Sn, Ge—Sb, Ag—Sn, Ag—Ge, Sn—Sb, Sb—Bi, etc. are preferable as alloys, SnO, $SnO_2$, $SnC_2O_4$, GeO, etc. are preferable as oxides, SnS, $SnS_2$, etc. are preferable as chalcogen compounds, and $SnF_2$, $SnCl_2$, $SnI_2$, $SnI_4$, etc. are preferable as halogen compounds. One kind of component A may be used, and two or more kinds may also be used.

As for the ratio of component A and component B in the composite powder, preferably component A is 5 to 80 mass % and component B is 95 to 20 mass %, and more preferably component A is 20 to 70 mass % and component B is 80 to 30 mass %, given that the total amount of both is 100 mass %. For example, given that component A is Sn and that component A (Sn) is 5 to 35 mass % and component B is 95 to 65 mass %, the capacity per weight of an active substance is 200 to 400 mAh/g and the cycle life characteristics are excellent, and thus this ratio is preferable for a long life negative electrode. On the other hand, given that component A (Sn) is 35 to 80 mass % and that component B is 65 to 20 mass %, the capacity per weight of an active substance is very high, 300 to 700 mAh/g, and thus this ratio is preferable for high capacity negative electrode. Furthermore, component A and component B may exist as the main component phase in the above described composite powder, and the existence of a very small amount of impurities does not adversely affect the cycle.

For simplification of description, the case of the use of S—Sb—Sn (S: 60 mol %, Sb: 20 mol % and Sn: 20 mol %) as component B is described hereinafter. It is needless to say, however, that component B is not limited to this only. In the negative electrode material for a sodium secondary battery according to the present invention, component B is phase-separated into sodium sulfide, antimony and tin through Na reduction during the process of initial charge (Na absorption). Since sodium sulfide is not involved as an active substance under the condition of 0 to 1 V (vs. $Na^+/Na$), it is not involved in subsequent charge and discharge reactions, either. Moreover, it exists as the framework in the composite powder, enhances the ionic conductivity of phase-separated Sb, Sn and/or component A involved in charge and discharge reaction, and effectively controls a volume change of the whole composite powder in spite of any volume change of phase-separated Sb, Sn and/or component A.

$Na_2S$ generated during the process of charge have excellent ionic conductivity. Component A is a metal component which reacts principally with Na, and it has excellent electric conductivity. Therefore, during the process of charge and discharge of the composite powder constituting the negative electrode material for a sodium secondary battery according to the present invention, excellent conductivity is obtained in terms of both ionic conductivity and electric conductivity. Component A and phase-separated Sb and Sn change into sodium phase by further absorbing Na and become a reversible phase of a capacitance component. As described above, the negative electrode material for a sodium secondary battery according to the present invention, which includes the above described composite powder, has large reversible electric capacity of phase-separated Sb and Sn, and component A and the framework of irreversible component of $Na_2S$ phase as both a solid electrolyte layer and buffer layer to exhibit excellent characteristics in terms of high capacity, cycle life, etc.

In the composite powder constituting the negative electrode material for a sodium secondary battery according to the present invention, preferably the surface of component A is coated with component B. The reason thereof is because with the existence of component B around the component A the ionic conductivity of component A can be enhanced during absorption and release (charge and discharge) of sodium and cracks caused by expansion and contraction can be controlled. Consequently, since an active substance, which with only component A has poor ionic conductivity and poor cycle life, can enhance the ionic conductivity and cycle characteristics, even an active substance with poor conductive properties or with high capacity (large volume expansion) improves its cycle life characteristics. Component A may be a primary particle itself or a cohered secondary particle, etc. The entire surface of component A may be coated with component B or only a part of component A may be coated with component B. If only a part of component A is coated with component B, 20% or more of the surface area of component A is coated with component B. In the present invention, it is possible to measure the ratio of component A coated with component B by using for example a picture taken by a scanning electron microscope (SEM).

The method of coating the surface of component A with component B is not particularly limited, but for example a method of mixing materials including component A and component B and performing a mechanical milling treatment can be used. The mechanical milling treatment is a method for applying external force of impact shock, tension, friction, compression, shear, etc. to the material powder (at lease component A and component B), and this method includes using a tumbling mill, vibrating mill, planetary mill, oscillating mill, horizontal mill, attritor mill, jet mill, grinding machine, homogenizer, fluidizer, paint shaker, mixer, etc. For example, in the method of using a planetary mill, the material powder and a ball are placed in a container, and the material powder can be crushed and mixed or subjected to solid-phase reaction with mechanical energy generated through rotation and revolution. It is known that this method can crush the powder into nano-order particles.

In the present invention, the material powder of a negative electrode material includes at least component A and component B. Since component B has low mechanical strength compared to component A, component B is easier to be crushed than component A. Therefore, the microparticulated powder of component B is pressure-bonded on the powder surface of component A by means of a ball, etc. so as to coat component A with component B.

As another method of coating the surface of component A with component B, there is a method of dispersing component A in melted component B and then crushing it after cooling. If the amount of component B is smaller than that of component A, it is difficult to coat component A with component B by means of the above described mechanical milling treatment, and therefore this method (the method of dispersing component A in melted component B and then crushing it after cooling) is preferably used. The conditions for melting component B are not particularly limited, but component B is not easily melted at the heating temperature of less than 400° C. and it is likely to be decomposed at the temperature of more than 1100° C. Therefore, the heating temperature is preferably around 400 to 1100° C. and more preferably 500 to 900° C.

Furthermore, when component A is coated with component B (that is, during the above described step (B)), a conductive aid may be included in component B. As a way of including the conductive aid in component B, a conductive aid may be dispersed in the melted state of component B. By including a conductive aid in component B, its conductivity can be improved, and the cycle life characteristics and the high rate discharge characteristics of a battery can be substantially improved. In addition, a conductive aid may be included in component B during the above described step (A), and a conductive aid may also be included in component B during both step (A) and step (B).

A conductive aid is not particularly limited, but since a metal, conductive polymer, etc. are likely to react with component B, preferably carbon black is used. As a carbon black, acetylene black (AB), ketjen black (KB), carbon fiber (VGCF), carbon nanotube (CNT), graphite, soft carbon, hard carbon, mesoporous carbon, graphene, vapor-phase growth carbon, etc. can be used. Furthermore, since the temperature of component B is high during melting, a carbon precursor may be used as a conductive aid. Given that component B is 100 wt %, the content of a conductive aid included is preferably 0.1 to 10 wt % and more preferably 0.5 to 5 wt %. When the content is 0.1 to 10 wt %, sufficient effect of improving conductivity is achieved, high rate discharge characteristics can be enhanced, and capacity reduction as a result of the removal of component B from component A can be minimized. Among the above described conductive aids, if a conductive aid with high cohesive properties such as carbon black is used, preferably the conductive aid is dispersed by a stirrer, ultrasonic waves or other means.

A sodium secondary battery using the above described composite powder as a negative electrode material for a sodium battery has high capacity, good cycle life characteristics and excellent water-resistant properties. In addition to the above described composite powder, the above described sulfide, etc. (for example, antimony sulfide, sulfide glass) or a sulfide, etc. with a conductive coating formed thereon can also be used as an effective negative electrode material for a sodium secondary battery. Adhesive formation on a power collector with the negative electrode material according to the present invention enables the negative electrode for a sodium secondary battery to function well.

Adhesive formation means fixing the negative electrode material according to the present invention to a power collector while they are in a contact. That is, it means filling the negative electrode material or fixing the negative electrode material with a power collector such as a metal net. The method of adhesive formation is not particularly limited, but for example, a pressure bonding method, slurry method, paste method, electrophoretic method, dipping method, spin coat method or aerosol deposition method can be used. Particularly, if a metal foam such as foamed nickel is used as a power collector, a slurry method or paste method is preferable in terms of the filling density, rate of manufacturing an electrode, etc.

For example, in addition to the negative electrode material according to the present invention, a conductive aid for adding conductivity or a binder for adding cohesive properties may be included in a negative electrode, as necessary. Furthermore, in manufacturing the negative electrode material according to the present invention, a conductive aid, binder, etc. can be included in component B by adding the conductive aid, binder etc. during the above described step (A) and/or step (B), but even in this case, a conductive aid, binder, etc. may be included in manufacturing the negative electrode using the negative electrode material. For example, an appropriate solution (such as N-methyl-2-pyrrolidone (NMP), water, alcohol, xylene and toluene) is added to a mixture (negative electrode mixture) including the above described negative electrode material as well as a conductive aid, binder, etc., and then it is sufficiently kneaded so as to obtain a paste composition of the negative electrode mixture, negative electrode mixture slurry, etc. The obtained paste composition of the negative electrode mixture, negative electrode mixture slurry, etc. is applied, dried, and then pressed on the surface of a power collector to form a negative electrode material-containing layer on the surface of the power collector. The layer can be used as a negative electrode. In order to prepare a sodium secondary battery with this negative electrode, a horn-shaped, cylinder-shaped, coin-shaped or other-shaped sodium secondary battery may be assembled using known battery elements (such as a positive electrode, separator and electrolyte) of a sodium secondary battery in accordance with a general method.

As a conductive aid, a generally used aid, for example any of the above described aids may be used, and if a carbon material is included in the aid, the type (structure, etc.) of the carbon material is not particularly limited. For example, a carbon material such as acetylene black (AB), ketjen black (KB), graphite, carbon fiber, carbon tube, graphene or amorphous carbon may be used singly or a combination of two or more of them may be used. More preferably, a material capable of forming a three-dimensional conductive mesh structure (for example, a conductive material in a flake form (such as flake copper powder and flake nickel powder), carbon fiber, carbon tube and amorphous carbon) in the composite powder is preferably used. With the formation of a three-dimensional conductive mesh structure, sufficient power can be collected for a negative electrode material for a sodium secondary battery, and volume expansion of an electrode (particularly an alloy component) can be effectively controlled during absorption of Na.

As a binder, a generally used material, such as polyvinylidene fluoride (PVdF), polytetrafluoroethylene (PTFE), polyimide (PI), polyamide, polyamide-imide, polyacryl, styrene-butadiene rubber (SBR), styrene-ethylene-buthylene-styrene copolymer (SEBS), carboxymethylcellulose (CMC), polyacrylic, PVA, PVB, EVA, etc. may be used singly or a combination of two or more of them may be used. However, if an active substance, which has made a composite with component A, is used and the capacity thereof exceeds 300 mAh/g, volume expansion is large during charge and discharge, and therefore it is preferable to use PI as a binder.

For example, in a negative electrode-containing negative electrode layer, preferably, the negative electrode material according to the present invention is 50 to 99 mass %, the content of a conductive aid is 0.5 to 40 mass %, and the content of a binder is 0.5 to 30 mass %. The thickness of a negative electrode-containing negative electrode layer depends on electrode capacity density, but for example it is preferably 0.5 to 200 μm. With the thickness of a layer including a negative electrode material in this range, an electric capacity suitable for practical use can be obtained while the negative electrode material is supported by a power collector.

A power collector is not particularly limited so long as it is a material with electronic conductivity that can be conducted through the supported negative electrode material. For example, a conductive substance such as C, Cu, Al, Ti, Cr, Ni, Mo, Ru, Rh, Ta, W, Os, Ir, Pt, and Au and an alloy including two or more of these conductive substances (for example, stainless steel) can be used. As a power collector, C, Cu, Al, Ti, Cr, Ni, Cu, Au, stainless steel, etc. is preferable in terms of high electric conductivity and high stability in electrolytic liquid, and C, Cu, Al, Ni, Cu, stainless steel, etc. is preferable in terms of low material cost. However, if there is unreacted sulfur in the sulfide solid solution, the power collector is likely to sulfurate during the heat treatment, and thus there is concern that mechanical strength of the power collector may remarkably deteriorate. Accordingly, C, Al or stainless steel, all of which hardly react with sulfur, is preferably used as a power collector. A power collector is configured in a line, stick, plate, foil, net, woven cloth, nonwoven cloth, expanded form, porous body or foam, and among them an expanded form, porous body or foam is preferable in terms of high filling density and good output characteristics.

As a positive electrode, any conventional material such as sodium cobalt oxide ($NaCoO_2$), sodium nickel oxide ($NaNiO_2$), sodium cobalt manganese nickel oxide ($NaCo_{0.33}Ni_{0.33}Mn_{0.33}O_2$), sodium manganese oxide ($NaMn_2O_4$), sodium iron oxide ($NaFeO_2$), sodium iron phosphate ($NaFePO_4$), a vanadium oxide-based material, a sulfur-based material, and graphite is used.

As a separator, any separator used for a known lithium secondary battery and sodium secondary battery can be used. For example, a porous sheet including resin such as polyethylene (PE), polypropylene (PP), polyester, cellulose and polyamide; glass filter; nonwoven cloth, etc. can be used, but not limited to them.

Since an electrolyte needs to include sodium ion, it is not particularly limited so long as it is used for a sodium secondary battery, but sodium salt is preferable as an electrolytic salt. For example, salt such as $NaPF_6$, $NaBF_4$. $NaClO_4$, $NaTiF_4$, $NaVF_5$, $NaAsF$, $NaSbF_6$, $NaCF_3SO_3$, $Na(C_2F_5SO_2)_2N$, $NaB(C_2O_4)_2$, $NaB_{10}Cl_{10}$, $NaB_{12}Cl_{12}$, $NaCF_3COO$, $Na_2S_2O_4$, $NaNO_3$, $Na_2SO_4$, $NaPF_3(C_2F_5)_3$, $NaB(C_6F_5)_4$, and $Na(CF_3SO_2)_3C$ can be used as the sodium salt. One kind of above described salt may be used, and a combination of two or more kinds may also be used. The above described sodium salts, which have excellent charge and discharge cycle characteristics because of their high electronegativity and easy ionization, can enhance the charge and discharge capacity of a secondary battery. Particularly, $NaPF_6$ is preferably used as electrolytic salt. When $NaPF_6$ is used as electrolytic salt, effect of improving the discharge capacity and cycle life of the positive electrode and improving the cycle life of the negative electrode is enhanced. In addition, the concentration of the electrolyte (concentration of the salt in a solvent) is not particularly limited, but it is preferably 0.1 to 3 mol/L, and more preferably 0.5 to 2 mol/L.

As a solvent for the above described electrolyte, at least one kind selected from a group consisting of propylene carbonate (PC), ethylene carbonate (EC), dimethyl carbonate (DMC), diethyl carbonate (DEC), ethyl methyl carbonate (EMC), γ-butyrolactone, 2-methyltetrahydrofuran, 1,3-dioxolan, 4-methyl-1,3-dioxolan, 1,2-dimethoxyethane, 1,2-diethoxyethane, diethyl ether, sulfolane, methyl sulfolane, nitromethane, N,N-dimethylformamide and dimethylsulfoxide can be used, and particularly a mixture of ethylene carbonate and diethyl carbonate or a simple substance of γ-butyrolactone is preferable. As for the mixing ratio of a mixture of ethylene carbonate and diethyl carbonate described above, both ethylene carbonate and diethyl carbonate can be adjusted within the range of 10 to 90 volume %. Particularly, EC-containing solvent is preferably used as the electrolyte solvent. When the EC-containing solvent is used as the electrolyte solvent, effect of improving the cycle life of the negative electrode can be enhanced. In general, EC, which is a solid at normal temperature, does not function as electrolyte by itself. However, when EC is mixed with PC, DMC, DEC, EMC or the like to make a mixed solvent, it functions as usable electrolyte even at normal temperature. Alternatively, a solid electrolyte may be used instead of a solvent. The structure of a sodium secondary batter is not particularly limited, but the sodium secondary battery can employ the existing battery configuration/structure of stack-type battery, winding-type battery or the like. A sodium secondary battery with the above described structure functions as a secondary battery.

EMBODIMENTS

Hereinafter, the present invention will be described in further detail with reference to embodiments, but the present invention is not limited to these embodiments.

Sulfide, Etc.

Nine kinds of Sulfides, etc. 1 to 9 consisting of the compositions shown in Table 1 were prepared. Commercially available antimony sulfide ($Sb_2S_3$) (made by Kojundo Chemical Co., Ltd) was used as Sulfide, etc. 1. Materials for Sulfides, etc. 2 to 5 were prepared according to the compositions shown in Table 1 below, and sulfide glasses were obtained by melting the prepared materials through heat treatment. As a heat treatment condition, the prepared materials were heated up to the specified temperature at the heating speed of 20° C./hour and then retained at the same temperature for 12 hours. Then, the prepared materials naturally cooled down to normal temperature so as to obtain Sulfides, etc. 2 to 5. It is confirmed that the obtained Sulfides, etc. 2 to 8 were vitrified through the XRD measurement of the sulfides using an X ray diffractometers. It is noted that Sulfides, etc. 1 and 9 were not vitrified.

TABLE 1

| | Composition (mol %) | | | | | | |
|---|---|---|---|---|---|---|---|
| | Sulfur | Antimony | | (i) | | | |
| | S | Sb | Sn | Ge | Bi | Ga | C |
| Sulfide, etc. 1 | 60 | 40 | — | — | — | — | — |
| Sulfide, etc. 2 | 57 | 27 | 16 | — | — | — | — |
| Sulfide, etc. 3 | 60 | 9 | 15 | 16 | — | — | — |
| Sulfide, etc. 4 | 60 | 36 | 2 | 2 | — | — | — |
| Sulfide, etc. 5 | 60.7 | 7.1 | 14.3 | 17.9 | — | — | — |
| Sulfide, etc. 6 | 61 | 36 | — | 3 | — | — | — |
| Sulfide, etc. 7 | 60 | 36 | — | — | 4 | — | — |
| Sulfide, etc. 8 | 60 | 36 | — | — | — | 4 | — |
| Sulfide, etc. 9 | 58 | 38.6 | — | — | — | — | 3.4 |

Embodiments 1 to 16 and Reference Examples 1 to 3

Component A and/or component B shown in Table 2 below as a starting material(s) is subjected to crushing or milling treatment using a planetary ball mill with a zirconia ball and container (at normal temperature and normal pressure and under the atmosphere of argon gas). The starting materials, the preparation ratio of component A and component B and the synthesis conditions (acceleration of gravity, and time) used in Embodiments 1 to 16 and Reference Examples 1 to 3 are shown in Table 2. The composite powder having the surface of component A coated with component B was obtained through milling treatment of component A and component B in Embodiments 6 to 11 and 16. Powder only including component B was obtained in Embodiments 1 to 5 and 12 to 15 since it only included component B, and powder only including component A was obtained in Reference Examples 1 to 3 since it only included component A.

TABLE 2

| | Starting Material | | | Synthesis Conditions | |
|---|---|---|---|---|---|
| Sample Name | Component A | Component B | A:B (mass %) | Acceleration of Gravity | Treatment Time |
| Embodiment 1 | — | Sulfide, etc. 1 | 0:100 | — | — |
| Embodiment 2 | — | Sulfide, etc. 2 | 0:100 | — | — |
| Embodiment 3 | — | Sulfide, etc. 3 | 0:100 | — | — |
| Embodiment 4 | — | Sulfide, etc. 4 | 0:100 | — | — |
| Embodiment 5 | — | Sulfide, etc. 5 | 0:100 | — | — |
| Embodiment 6 | Sn | Sulfide, etc. 2 | 30:70 | 100 G | 1 h |
| Embodiment 7 | Sn | Sulfide, etc. 2 | 50:50 | 100 G | 1 h |

TABLE 2-continued

| Sample Name | Starting Material | | | Synthesis Conditions | |
|---|---|---|---|---|---|
| | Component A | Component B | A:B (mass %) | Acceleration of Gravity | Treatment Time |
| Embodiment 8 | Sn | Sulfide, etc. 1 | 26:74 | 100 G | 1 h |
| Embodiment 9 | Sn | Sulfide, etc. 1 | 41:59 | 100 G | 1 h |
| Embodiment 10 | SnS | Sulfide, etc. 1 | 31:69 | 100 G | 1 h |
| Embodiment 11 | SnSGe | Sulfide, etc. 1 | 35:65 (Component A breakdown) SnS 30%:Ge 5% | 100 G | 1 h |
| Embodiment 12 | | Sulfide, etc. 6 | 0:100 | — | — |
| Embodiment 13 | | Sulfide, etc. 7 | 0:100 | — | — |
| Embodiment 14 | | Sulfide, etc. 8 | 0:100 | — | — |
| Embodiment 15 | | Sulfide, etc. 9 | 0:100 | — | — |
| Embodiment 16 | Sn | Sulfide, etc. 3 | 30:70 | 100 G | 1 h |
| Reference Example 1 | Sn | — | 100:0 | — | — |
| Reference Example 2 | $SnS_2$ | — | 100:0 | — | — |
| Reference Example 3 | Sb | — | 100:0 | — | — |

Evaluation of Battery Properties

Using the negative electrode material obtained in Embodiments 1 to 16 and Reference Examples 1 to 3 as a negative electrode active substance, a slurry mixture was prepared by mixing a negative electrode active substance: 80 wt %, PI binder: 15 wt % and KB: 5 wt %, and a test electrode (negative electrode) was obtained by applying and drying the mixture on a metal foil, joining the applied film with the metal foil tightly by a roll press machine and then heat-treating it (under reduced pressure, at 200° C. and for an hour or longer). A copper foil (43 μm in thickness) was used as the metal foil in Embodiments 1 to 5 and 12 to 15, and Reference Examples 1 to 3, and an aluminum foil (20 μm in thickness) was used as the meal foil in Embodiments 6 to 11 and 16. It is noted that a test electrode using a copper foil (20 μm in thickness) was also prepared for Embodiment 8 under the same condition (hereinafter, the test electrode with the copper foil is referred to as "Embodiment 8-1" and the test electrode with the aluminum foil is referred to as "Embodiment 8-2"). A test cell (coin cell (CR2032)) was prepared including a counter electrode, a separator, and an electrolyte, wherein a metal sodium foil (13 mm in diameter, 0.5 mm in thickness) was used as the counter electrode, a glass filter (GA100) was used as the separator, and a solution in which $NaP_6$ was solved in a mixed solvent of EC:DMC (1:1 volume %) (concentration: 1 mol/L) was used as the electrode.

Evaluation 1: Cycle Life Characteristics

Figure 8:
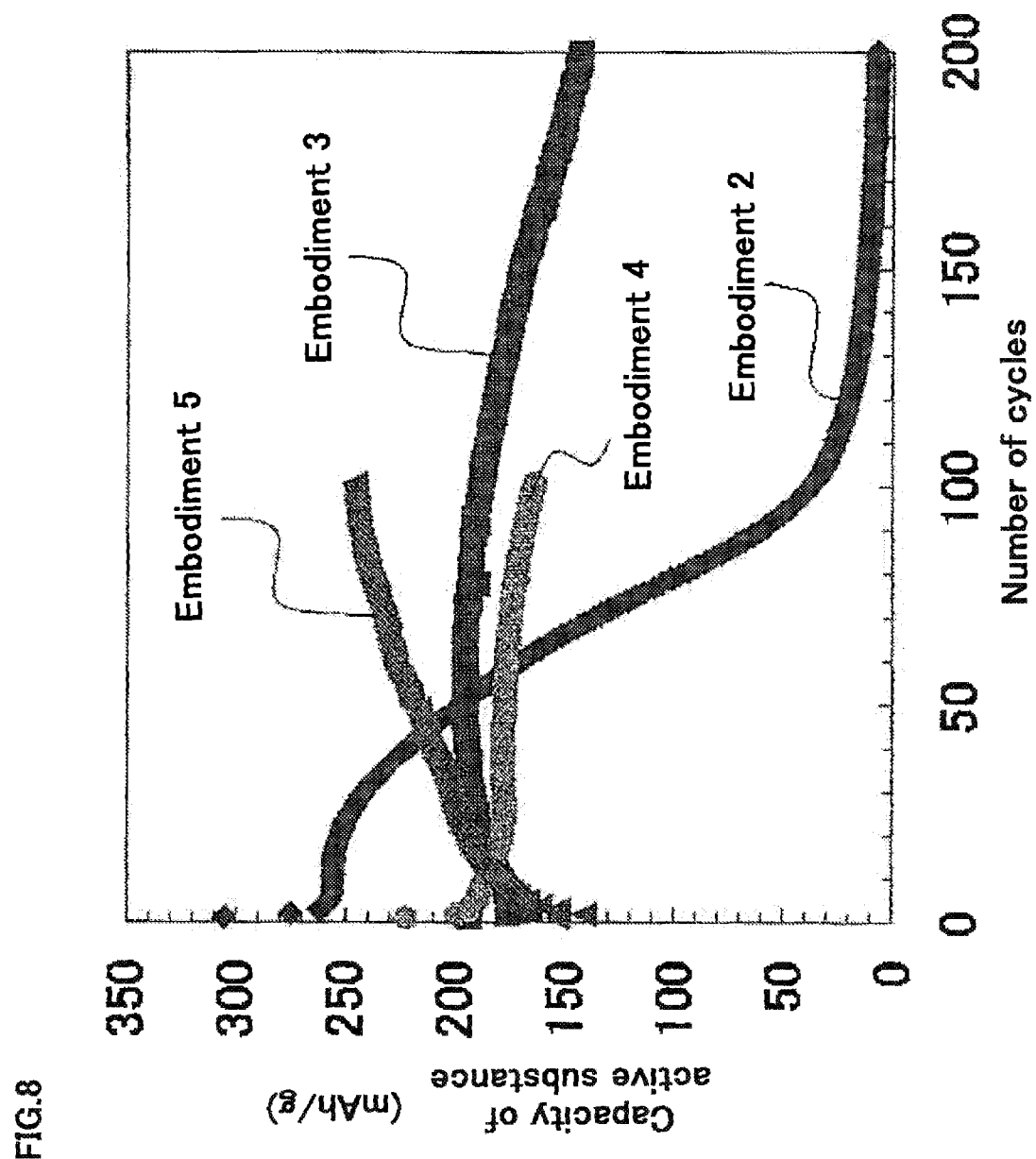
FIG. 8 is a graph showing the cycle lives of Embodiments 2 to 5.
Figure 9:
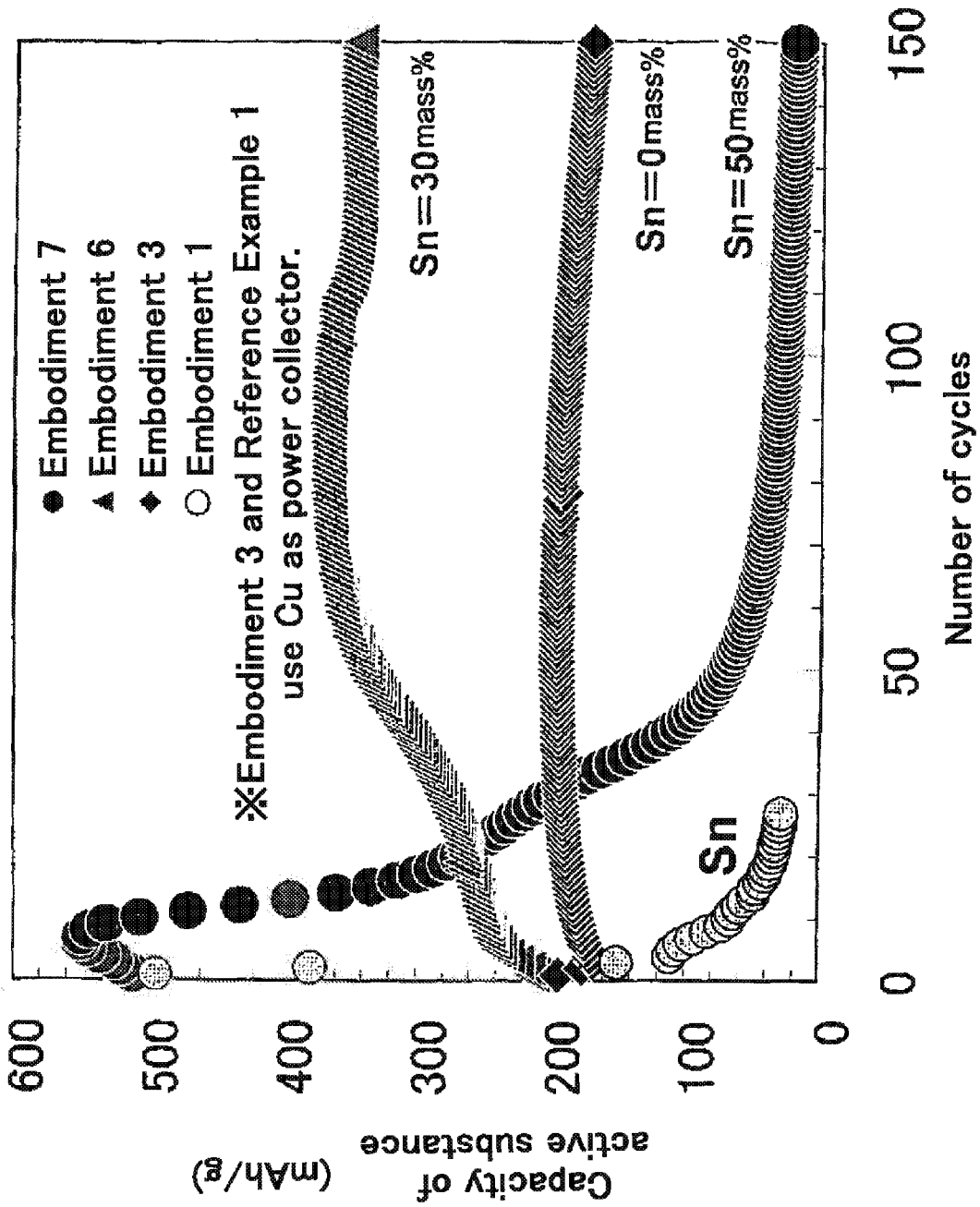
FIG. 9 is a graph showing the cycle lives of Embodiments 3, 6 and 7, and Reference Example 1.
Figure 10:
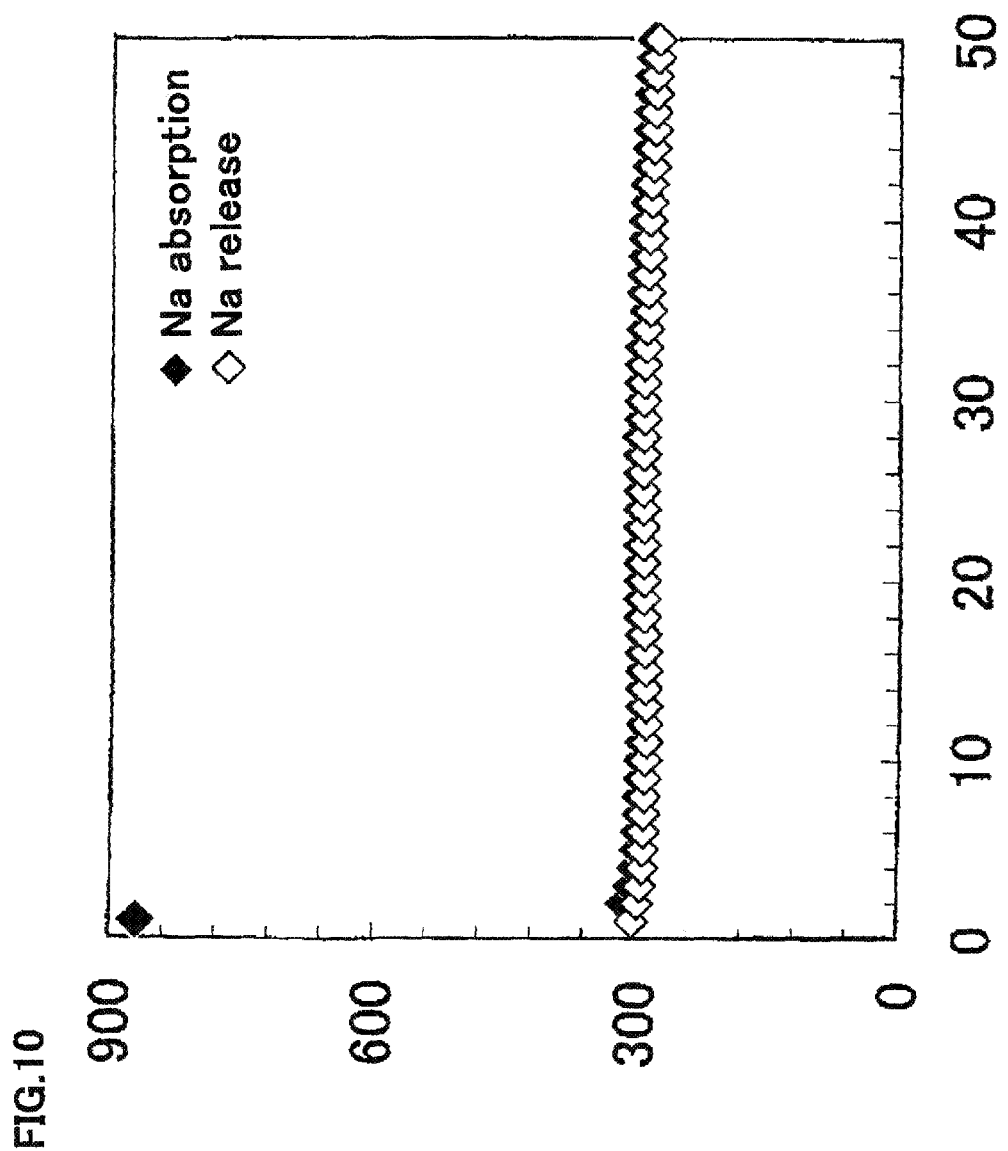
FIG. 10 is a graph showing the cycle life of Embodiment 8-1.
Figure 22:
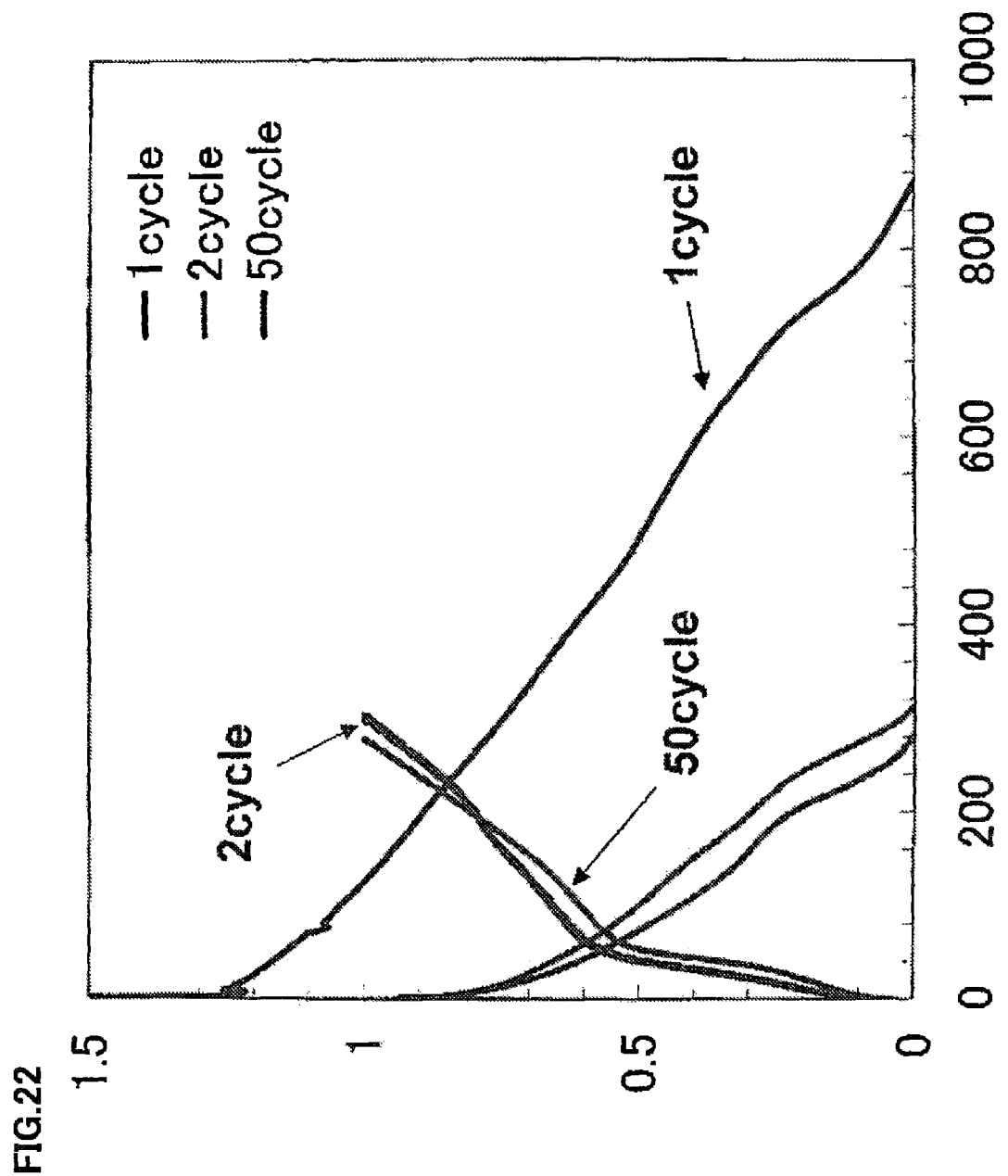
FIG. 22 is a graph of the charge and discharge curve of Embodiment 8-1.

A charge and discharge test was carried out on the prepared test cell (sodium secondary battery) at the rate of 0.5 C. The cutoff potential was set at 0 to 1 V (vs. $Na^+/Na$). All of the cycle lives of Embodiments 1 to 16 and Reference Examples of 1 to 3 are shown in Table 3. The cycle lives of Embodiments 1 to 7 are respectively shown in FIGS. 1 to 7, all of the cycle lives of Embodiments 2 to 5 are shown in FIG. 8, and all of the cycle lives of Embodiments 3, 6 and 7, and Reference Example 1 are shown in FIG. 9. The cycle lives of Embodiments 8-1, 8-2, 9, 10, and 11 are respectively shown in FIGS. 10 to 13, all of the cycle lives of Embodiments 1 and 8-1, and Reference Example 2 are shown in FIG. 14. In addition, the charge and discharge curves of Embodiments 1 to 7 are respectively shown in FIGS. 15 to 21, and the charge and discharge curves of Embodiments 8-1, 8-2, and 9 are respectively shown in FIGS. 22 to 24.

TABLE 3

| | Discharge Capacity (mAh/g) | | |
|---|---|---|---|
| Sample Name | 10th cycle | 50th cycle | 100th cycle |
| Embodiment 1 | 232 | 209 | 151 |
| Embodiment 2 | 256 | 198 | 40 |
| Embodiment 3 | 179 | 196 | 188 |
| Embodiment 4 | 187 | 177 | 165 |
| Embodiment 5 | 182 | 220 | 246 |
| Embodiment 8 | 249 | 339 | 365 |
| Embodiment 7 | 505 | 70 | 29 |
| Embodiment 8-1 | 288 | 277 | — |
| Embodiment 8-2 | 341 | 351 | 325 |
| Embodiment 9 | 329 | 331 | — |
| Embodiment 10 | 216 | 224 | 223 |
| Embodiment 11 | 269 | 278 | 264 |
| Embodiment 12 | 225 | 210 | 156 |
| Embodiment 13 | 223 | 201 | 141 |
| Embodiment 14 | 230 | 206 | 145 |
| Embodiment 15 | 219 | 210 | 168 |
| Embodiment 16 | 314 | 307 | 289 |
| Reference Example 1 | 66 | — | — |
| Reference Example 2 | 301 | 395 | 97 |
| Reference Example 3 | 88 | 22 | 10 |

The following can be understood from FIGS. 1 to 9 and 15 to 21, and Table 3 showing the cycle lives and the charge and discharge characteristics of Embodiments 1 to 7, and Reference Examples 1 and 3.

(1) Embodiment 1 has a low capacity of about 200 mAh/g, but the cycle life characteristics thereof are stable. Compared to the case where only Sn was used (Reference Example 1) and the case where only Sb was used (Reference Example 3), Embodiment 1 has better cycle life characteristics (see FIGS. 1, 9 and 15, and Table 3).

Figure 1:
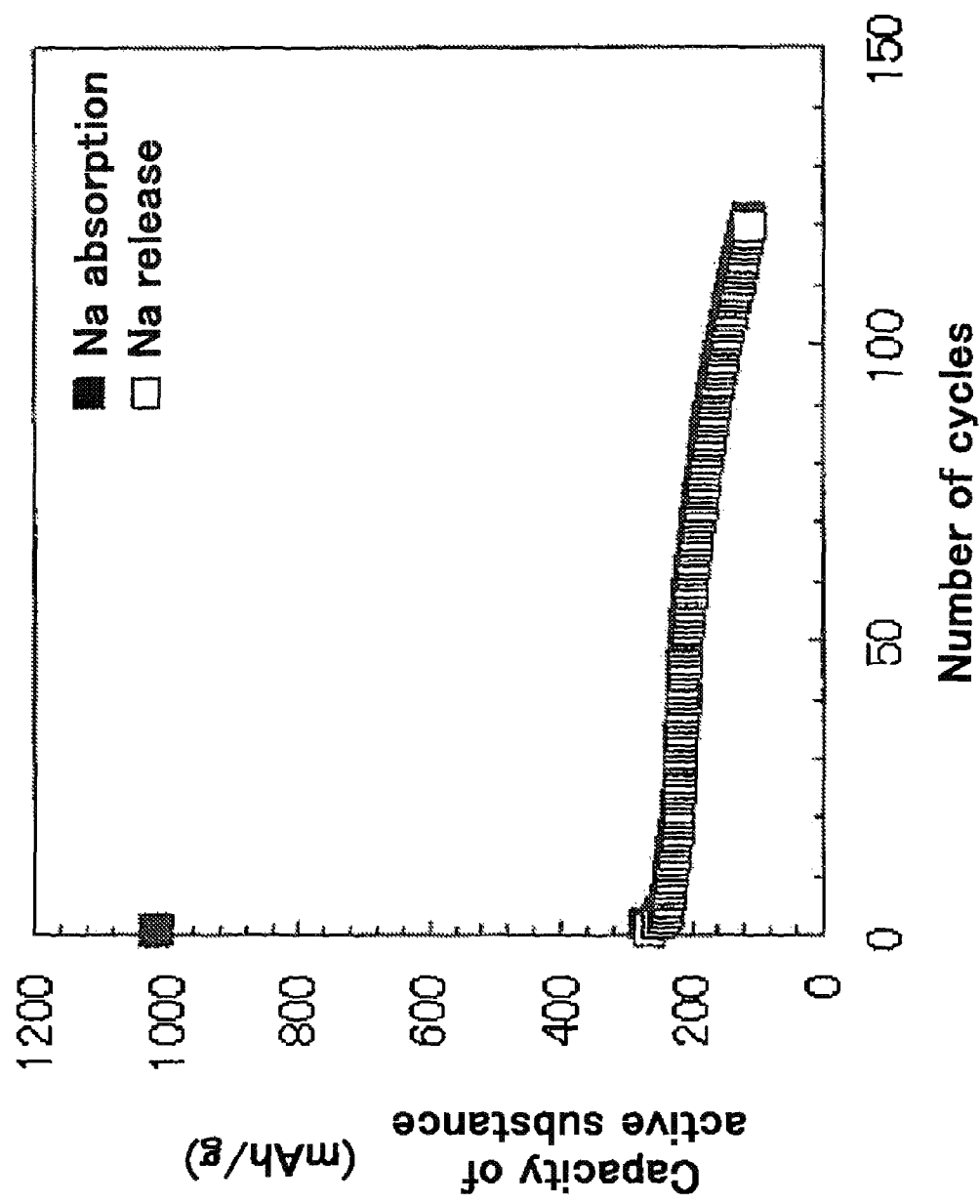
FIG. 1 is a graph showing the cycle life of Embodiment 1.
Figure 2:
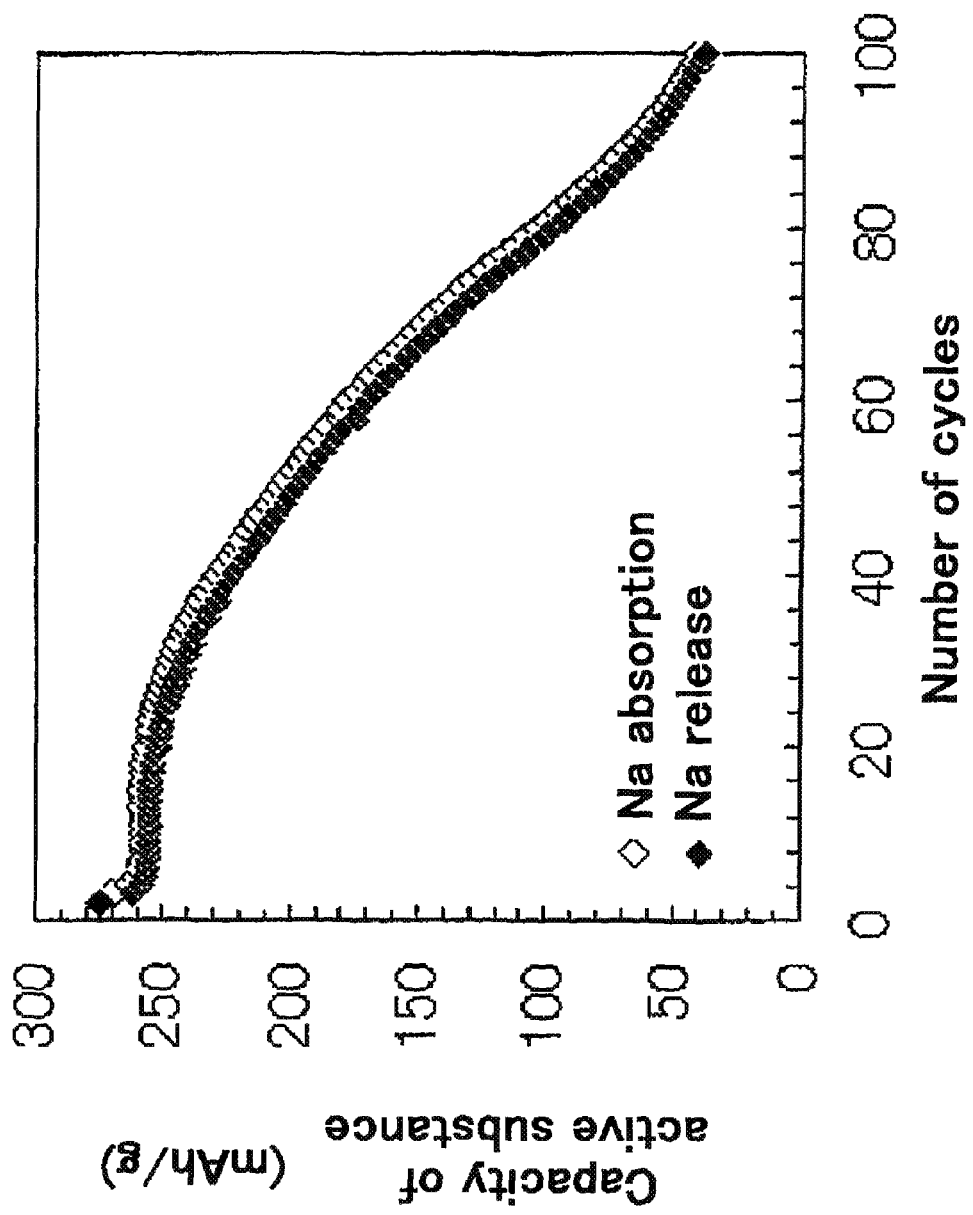
FIG. 2 is a graph showing the cycle life of Embodiment 2.
Figure 3:
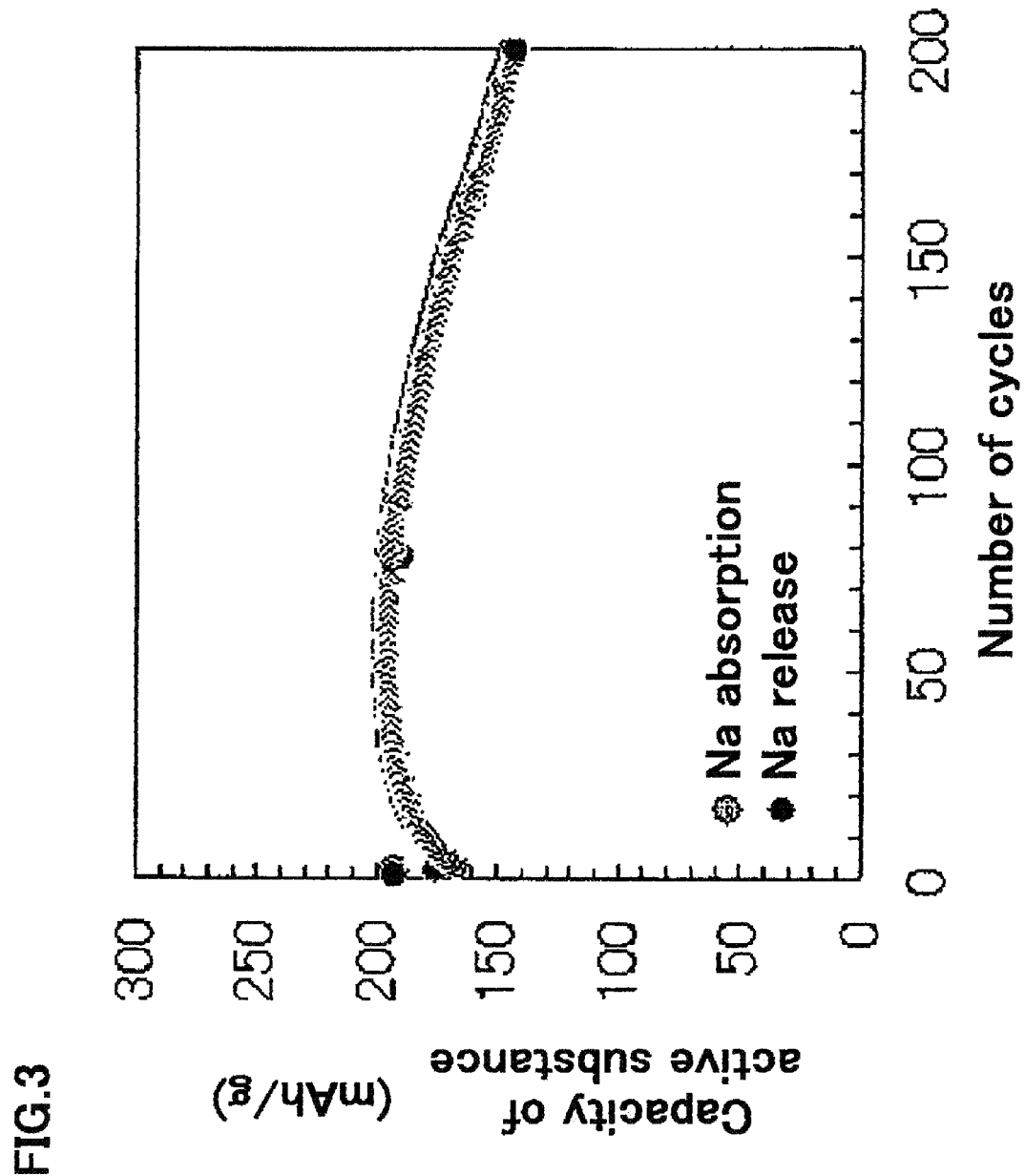
FIG. 3 is a graph showing the cycle life of Embodiment 3.
Figure 15:
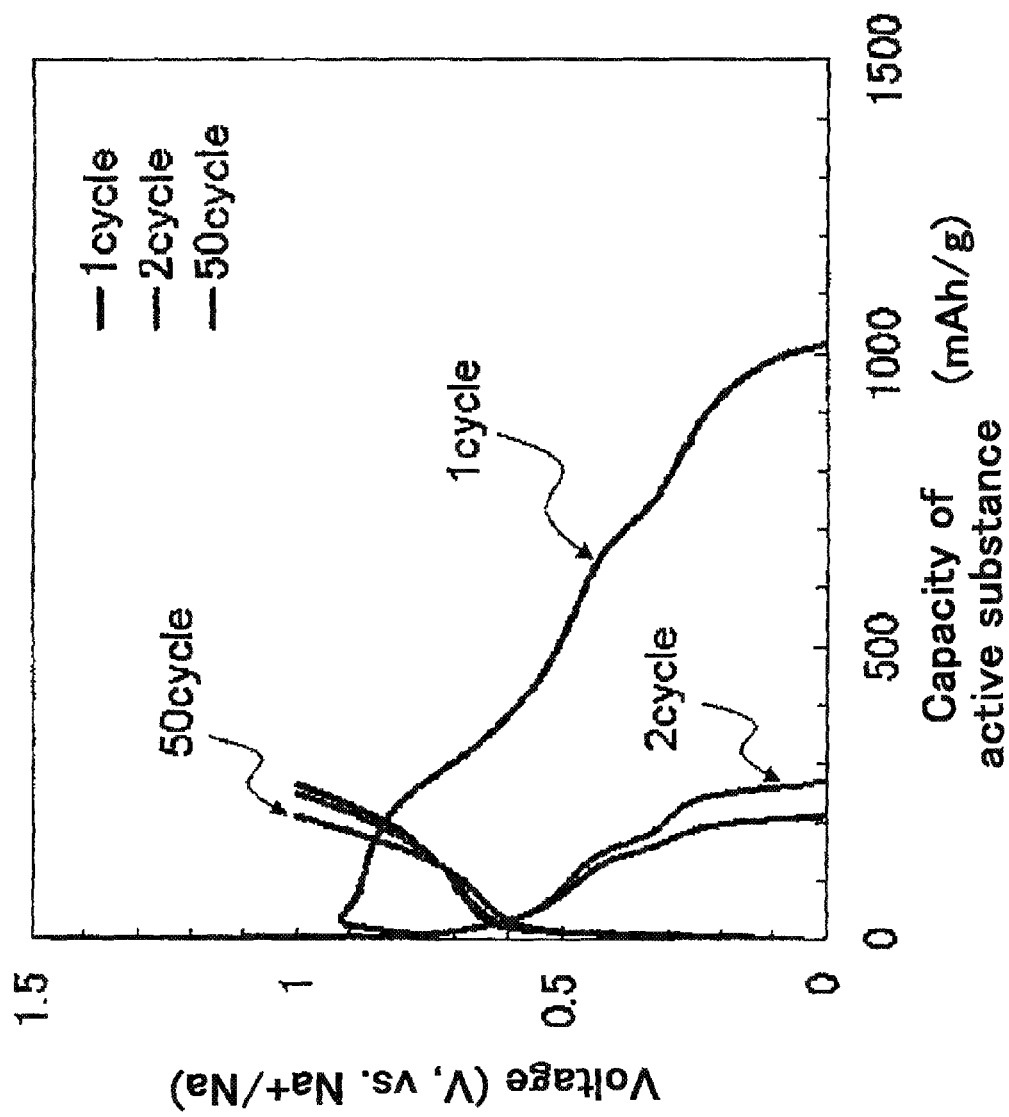
FIG. 15 is a graph of the charge and discharge curve of Embodiment 1.
Figure 16:
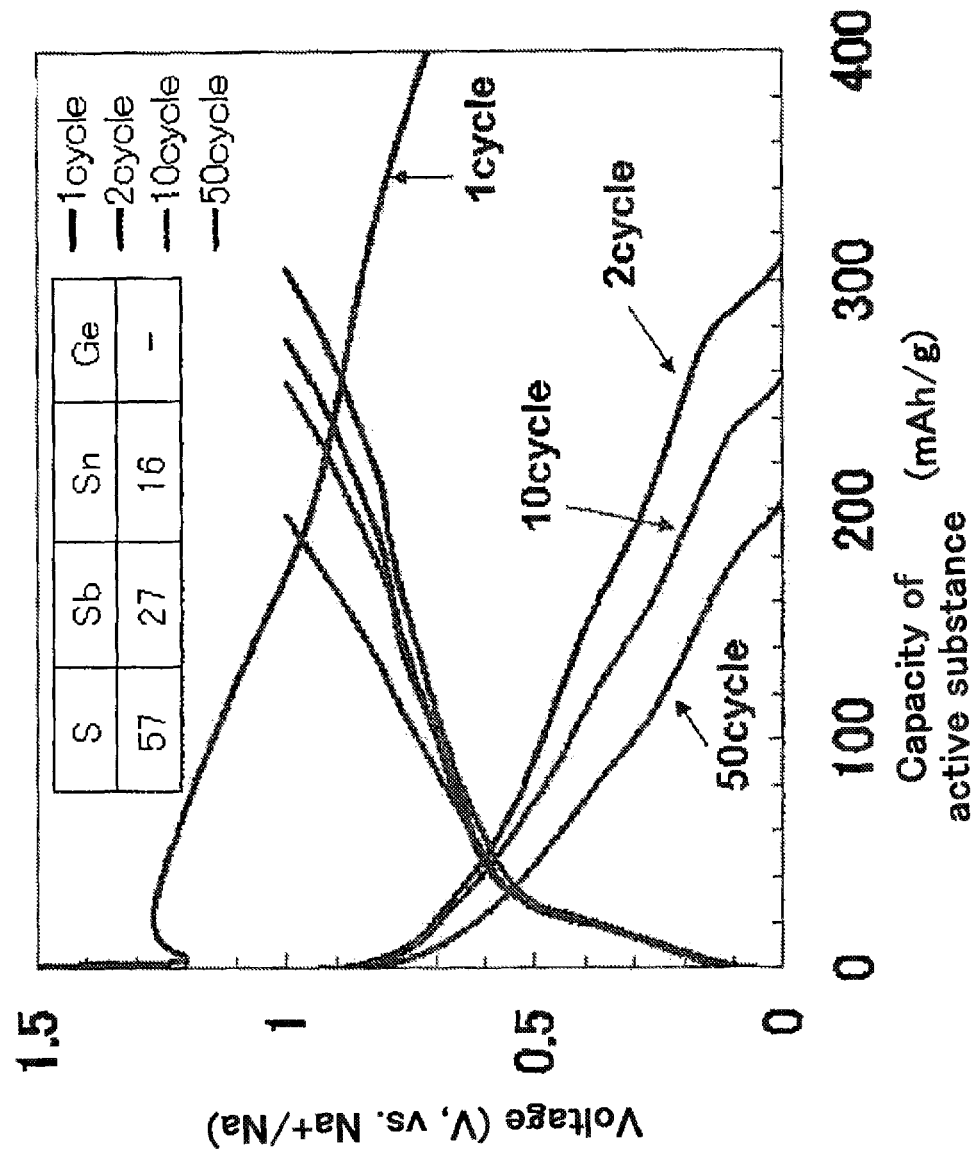
FIG. 16 is a graph of the charge and discharge curve of Embodiment 2.
Figure 17:
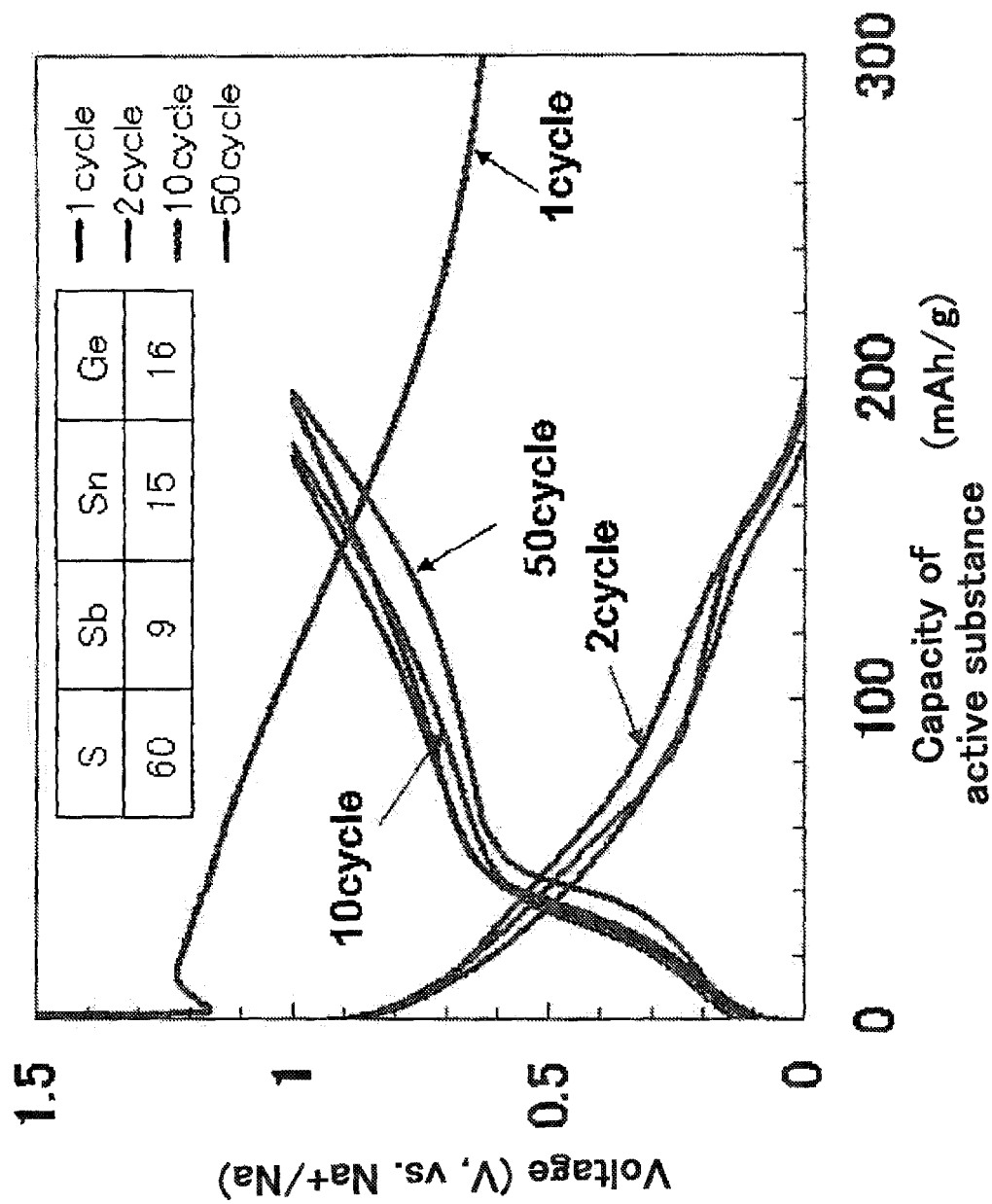
FIG. 17 is a graph of the charge and discharge curve of Embodiment 3.

(2) Embodiment 2 has better cycle life characteristics compared to the case where only Sn was used (Reference Example 1) and the case where only Sb was used (Reference Example 3), but the capacity thereof decreases after 40 cycles (see FIGS. 2, 9 and 15, and Table 3).

(3) Embodiment 3 has better cycle life characteristics than Embodiments 1 and 2. The reason thereof is supposedly because Embodiment 3 contains Ge (see FIGS. 3, 8 and 17).

Figure 4:
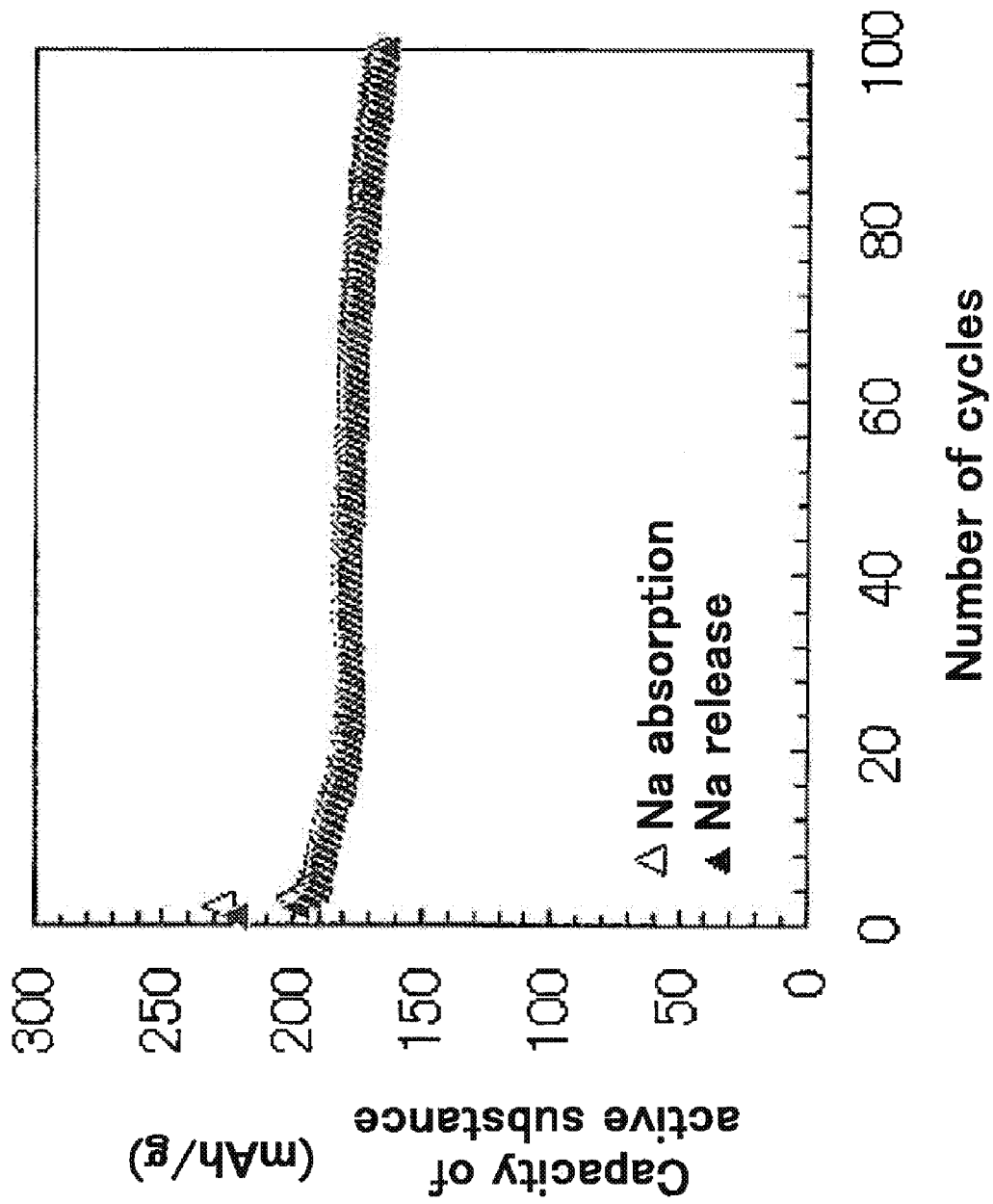
FIG. 4 is a graph showing the cycle life of Embodiment 4.
Figure 18:
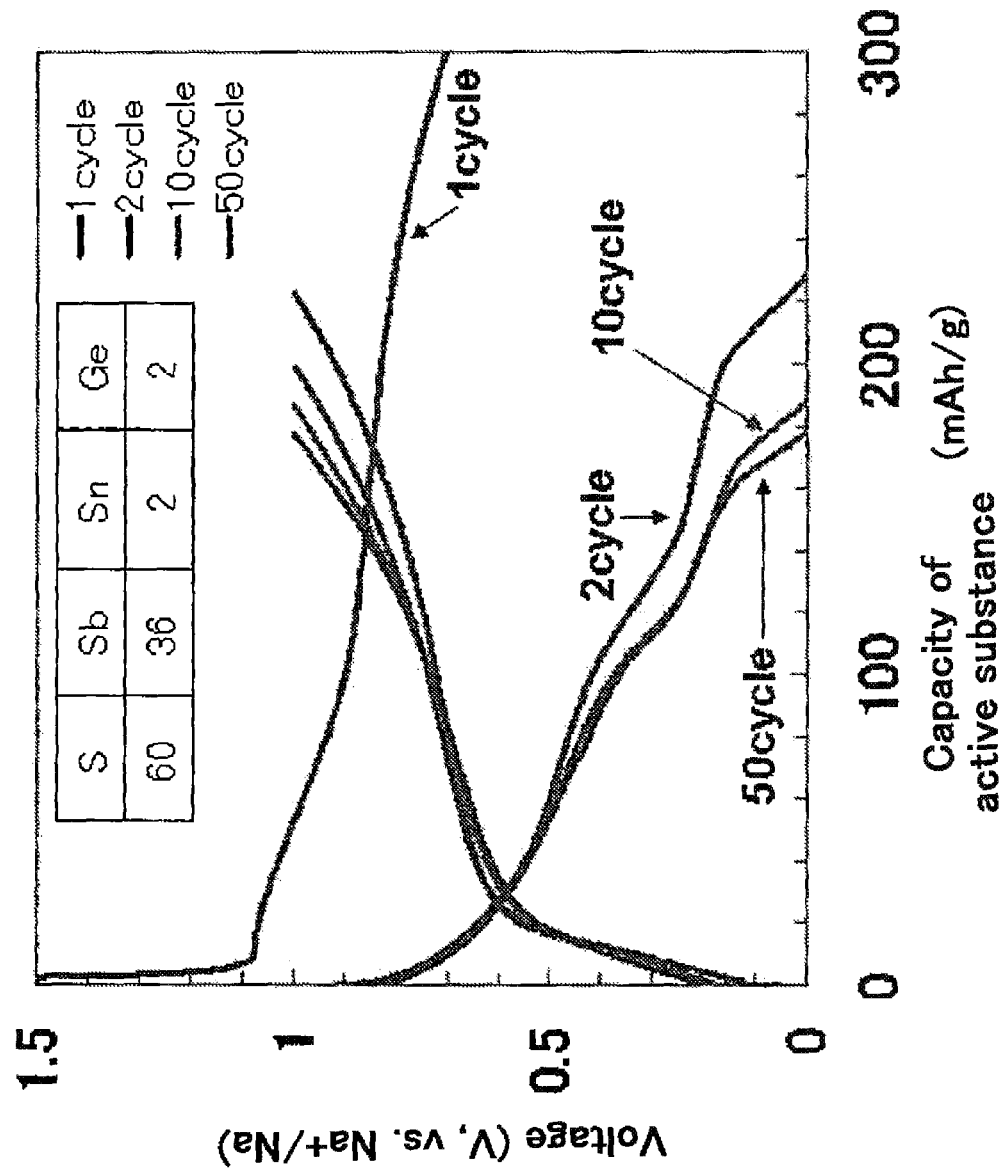
FIG. 18 is a graph of the charge and discharge curve of Embodiment 4.

(4) Embodiment 4 has better cycle life characteristics than Embodiments 1 and 2, and it is recognized that the cycle life characteristics are good even if the amount of Sb in Embodiment 3 is increased (see FIGS. 4, 8 and 18).

Figure 5:
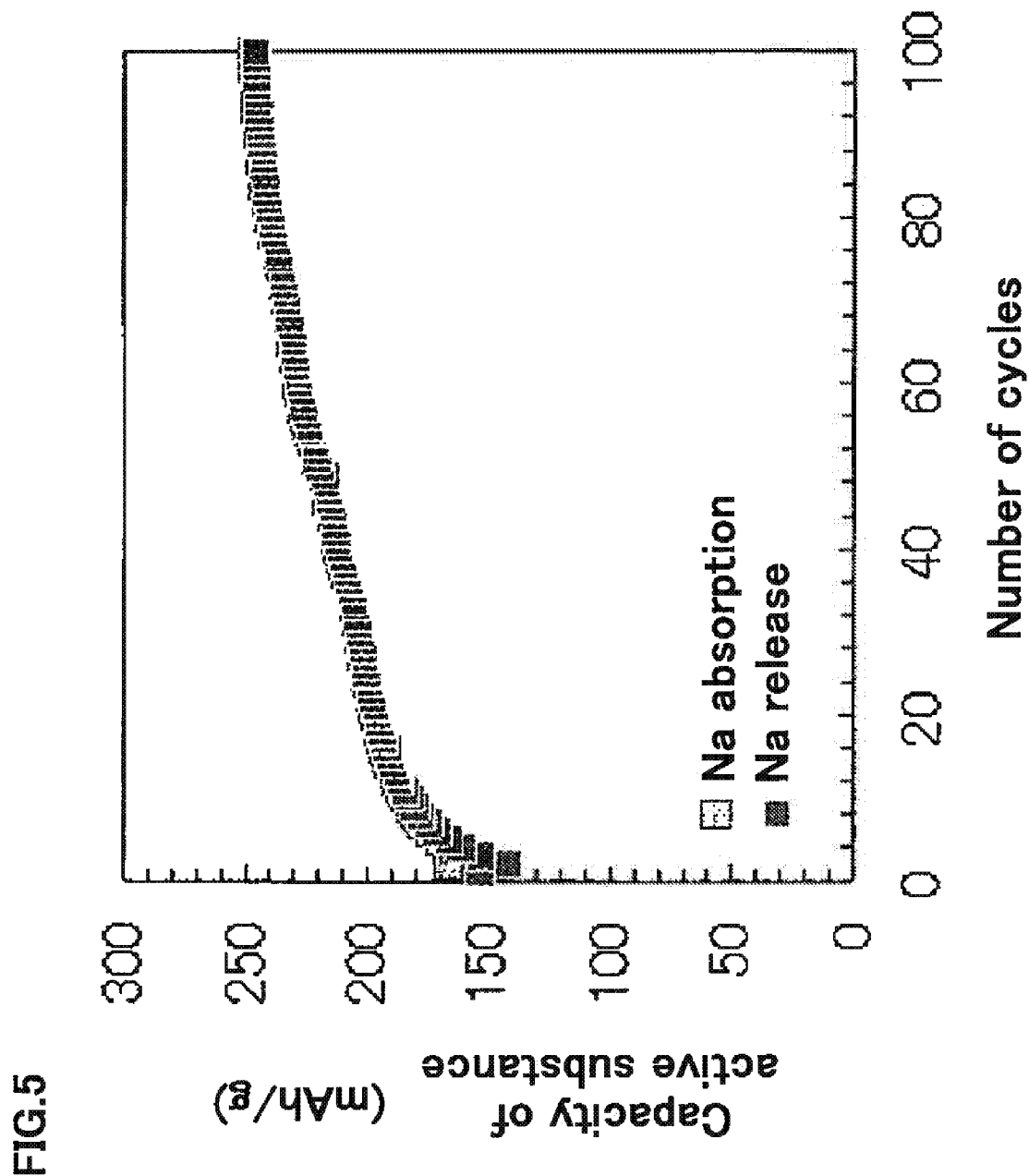
FIG. 5 is a graph showing the cycle life of Embodiment 5.
Figure 6:
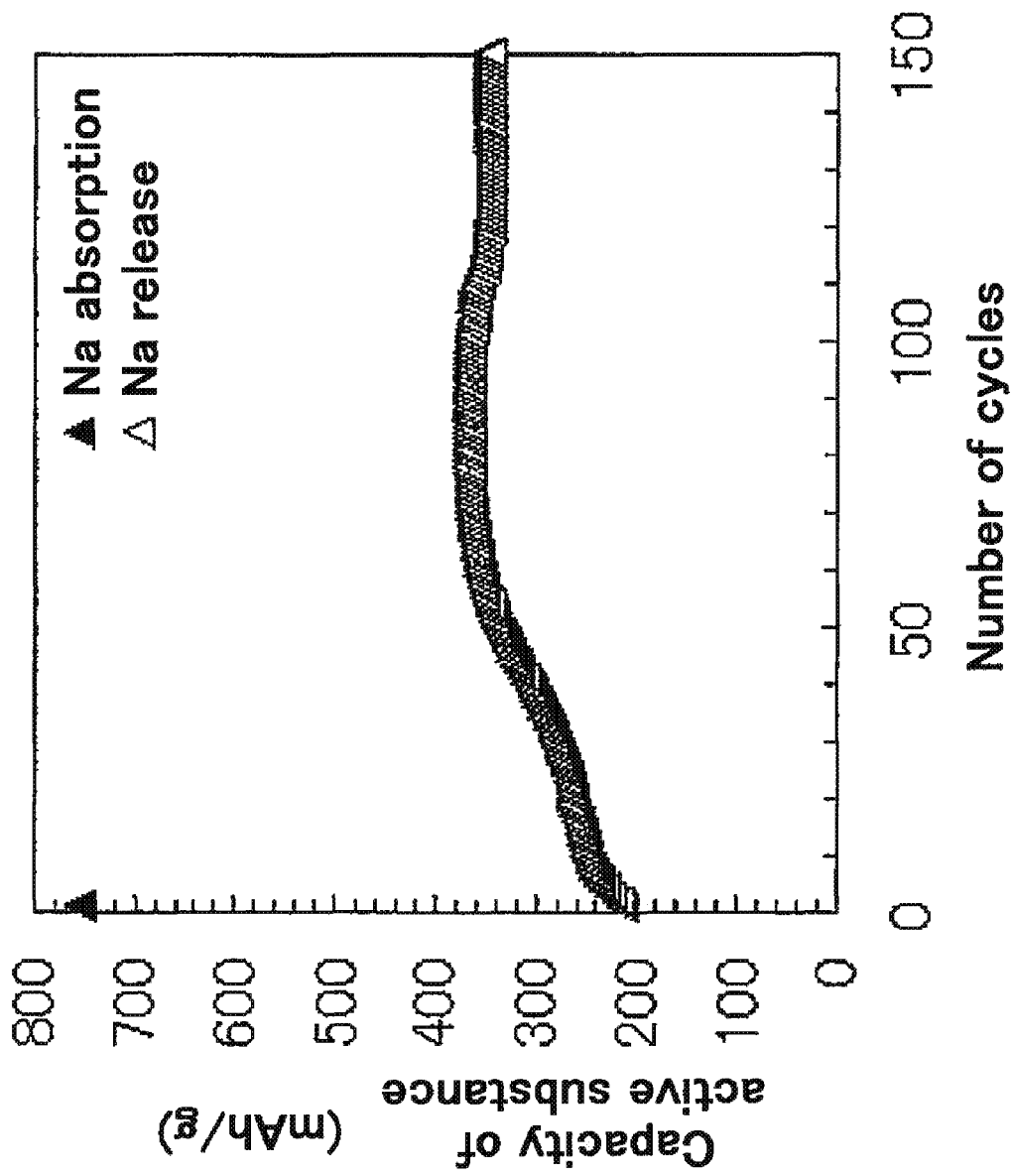
FIG. 6 is a graph showing the cycle life of Embodiment 6.
Figure 7:
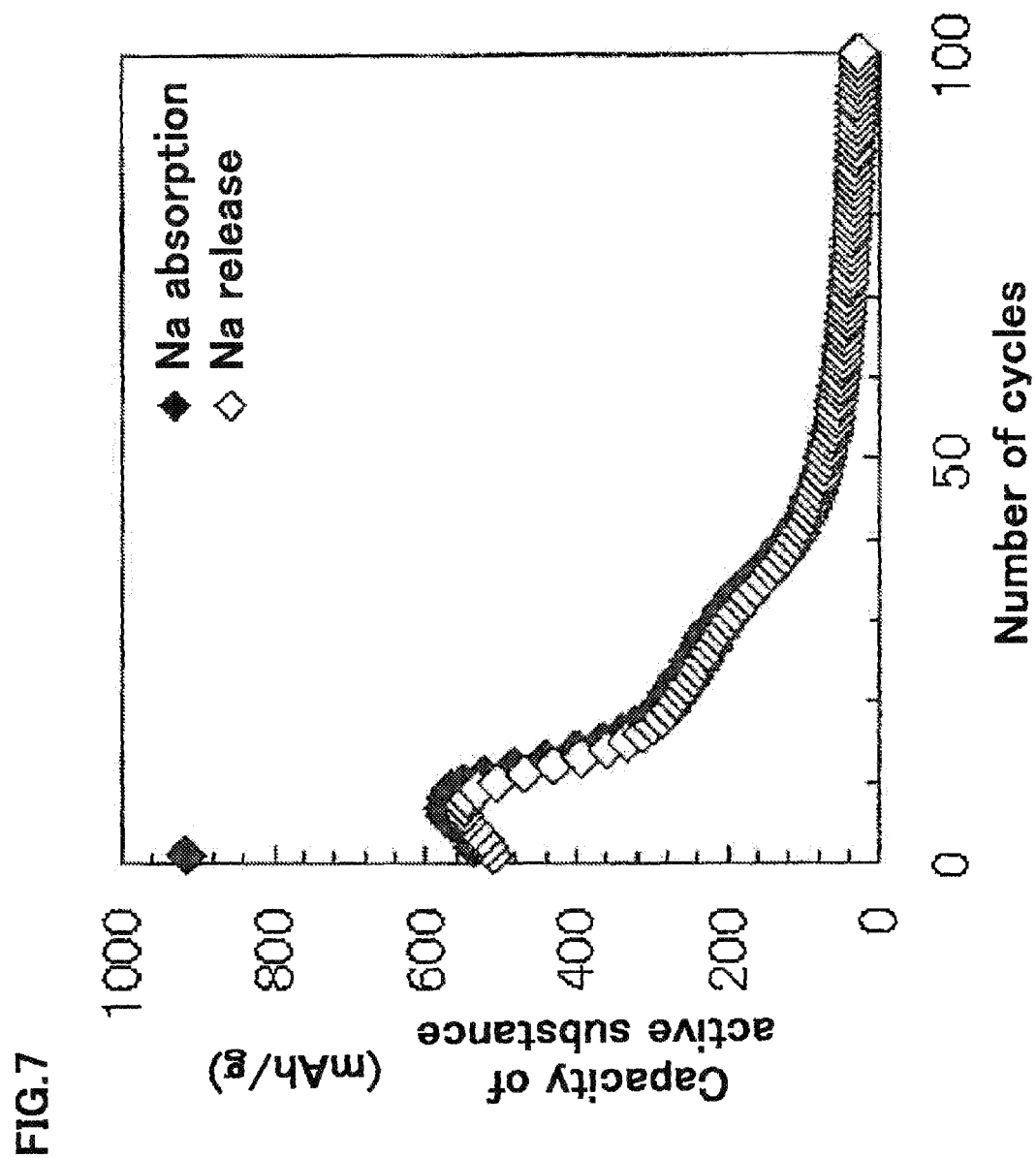
FIG. 7 is a graph showing the cycle life of Embodiment 7.
Figure 19:
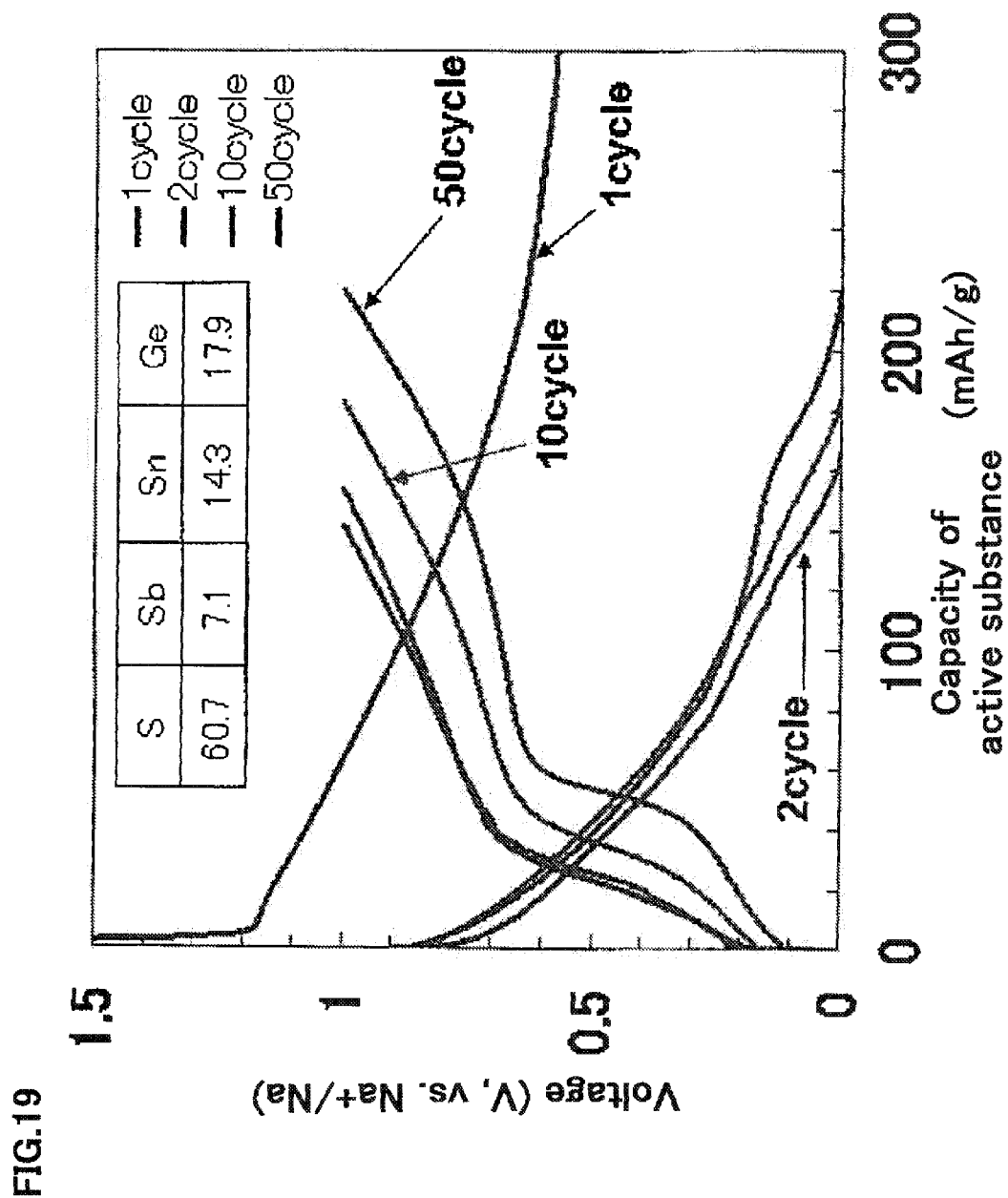
FIG. 19 is a graph of the charge and discharge curve of Embodiment 5.
Figure 20:
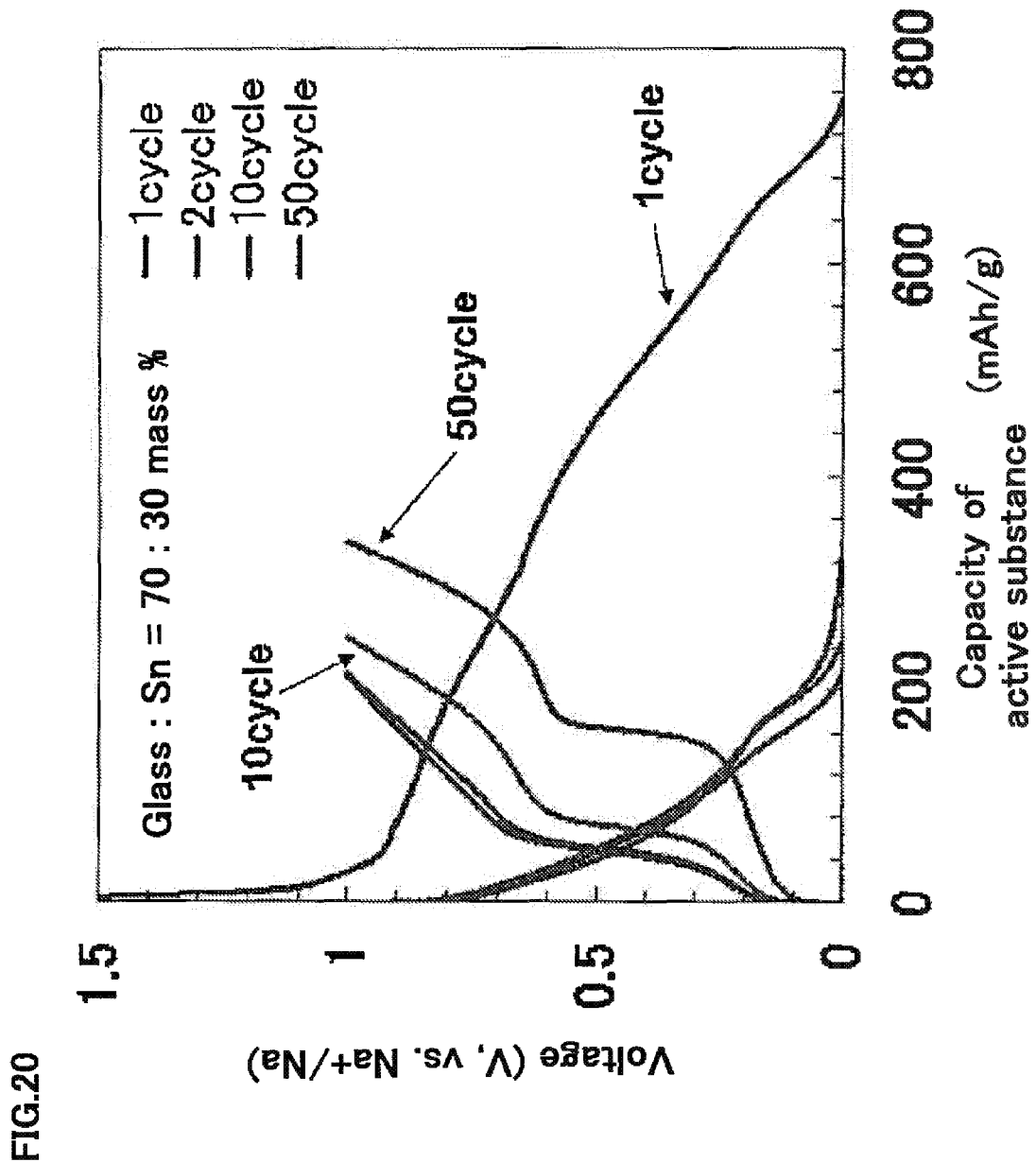
FIG. 20 is a graph of the charge and discharge curve of Embodiment 6.
Figure 21:
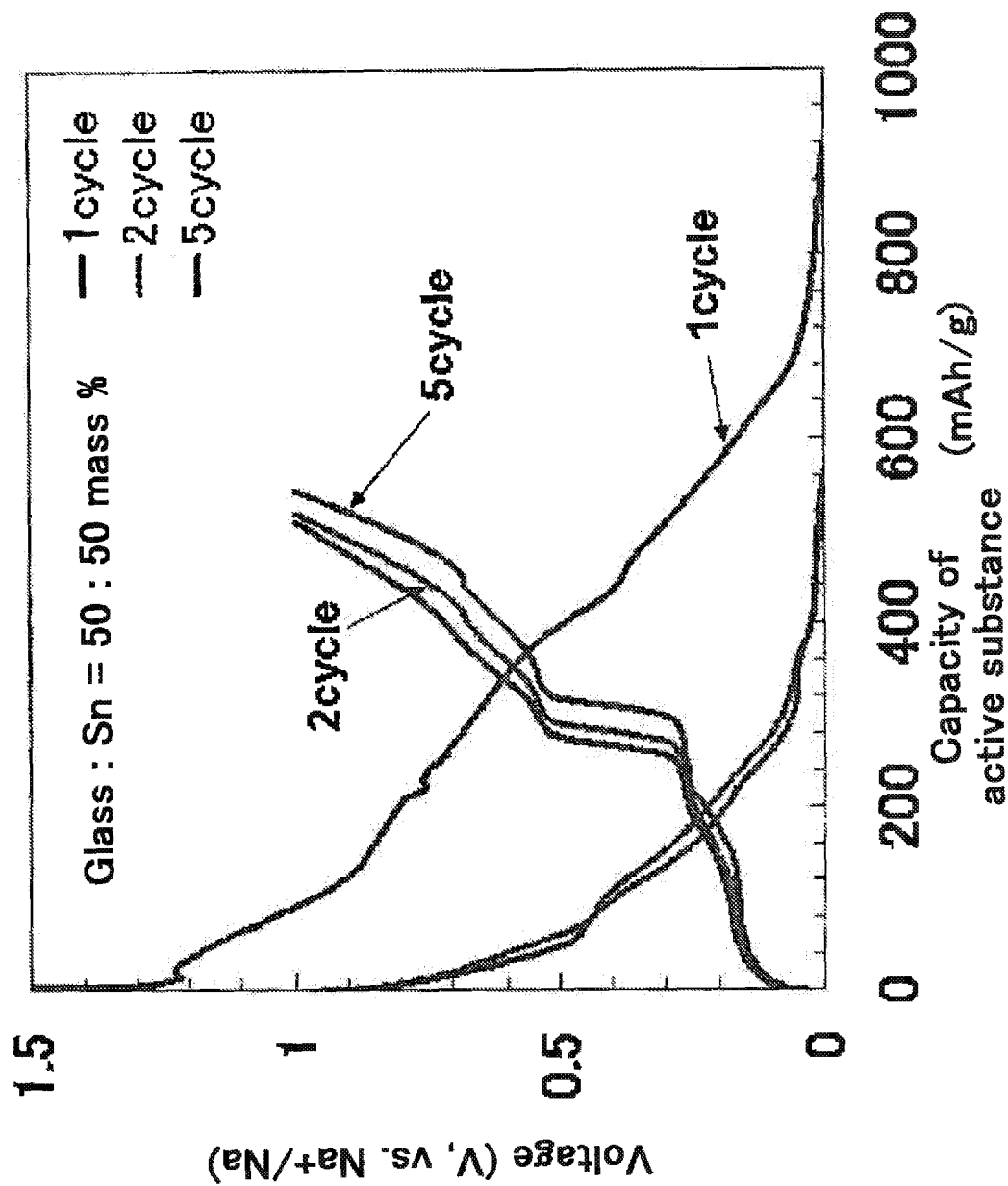
FIG. 21 is a graph of the charge and discharge curve of Embodiment 7.

(5) Embodiment 5 has the capacity of its active substance increased as the number of cycles increases (see FIGS. 5, 8 and 19).

(6) The cycle life characteristics of Embodiments 2 to 5 are good in order of Embodiment 3, Embodiment 4, Embodiment 5, and Embodiment 2 (see FIG. 8).

(7) Embodiment 6 has the capacity of its active substance more increased than that of Embodiment 3. It is recognized from this that the capacity of an active substance increases when sulfide, etc. and Sn make a composite (see FIGS. 6 and 20).

(8) Embodiment 7 has the capacity of its active substance up to ten cycles (500 to 600 mAh/g) larger than that of Embodiment 6, but its cycle characteristics became poor. It is recognized from this that the cycle life characteristics deteriorate when the amount of Sb for making a composite with sulfide, etc. is excessive (see FIGS. 7, 9 and 21).

The following can be understood from FIGS. 10 to 14 and 22 to 24 showing the cycle lives and the charge and discharge characteristics of Embodiments 8 to 11, and Reference Example 2.

(9) Embodiment 8-1 has a stable capacity of its active substance equal to or larger than 300 mAh/g over many cycles. It is recognized from this that even if sulfide, etc. 1 ($Sb_2S_3$) which is not vitrified is used as raw material, the capacity of its active substance and its cycle life characteristics remarkably improve when the sulfide, etc. 1 makes a composite with another material (Sn) (see FIGS. 10, 14 and 22).

Figure 11:
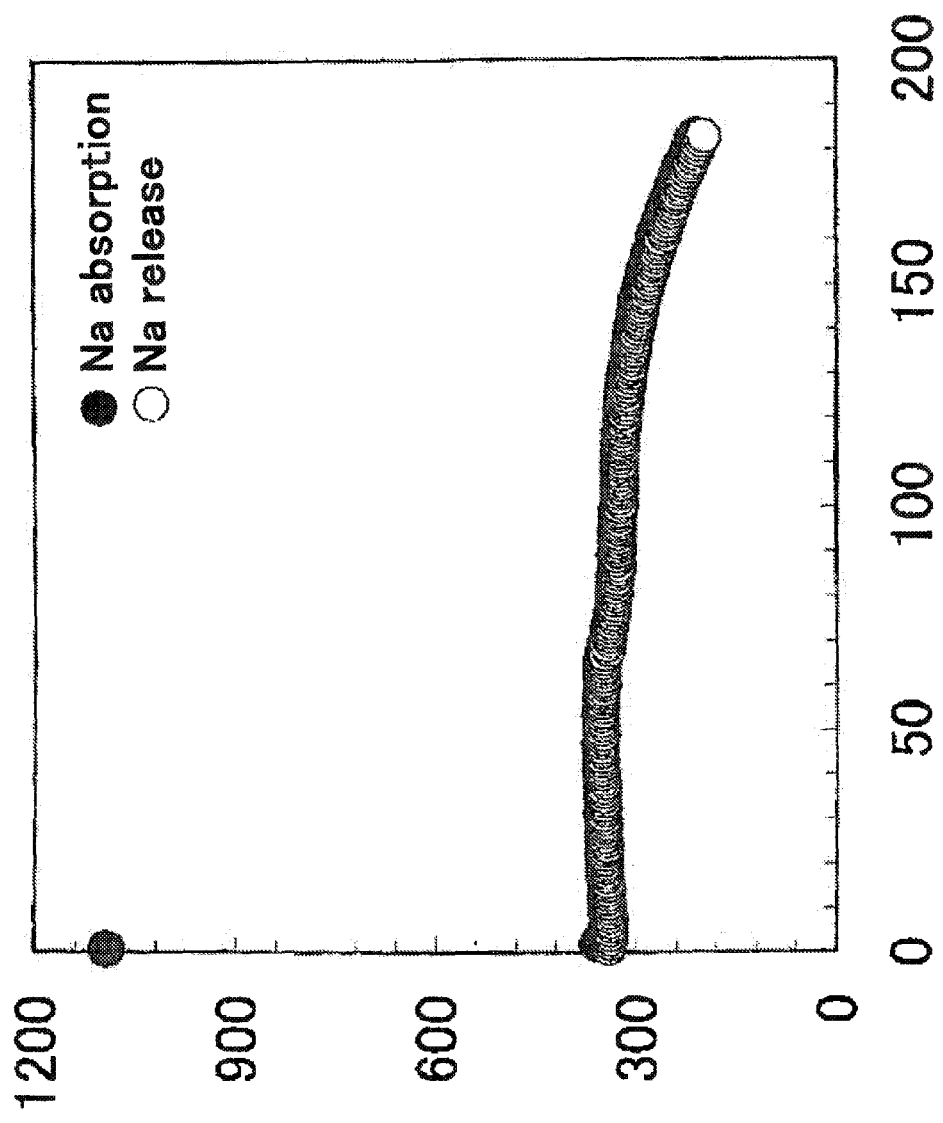
FIG. 11 is a graph showing the cycle life of Embodiment 8-2.
Figure 12:
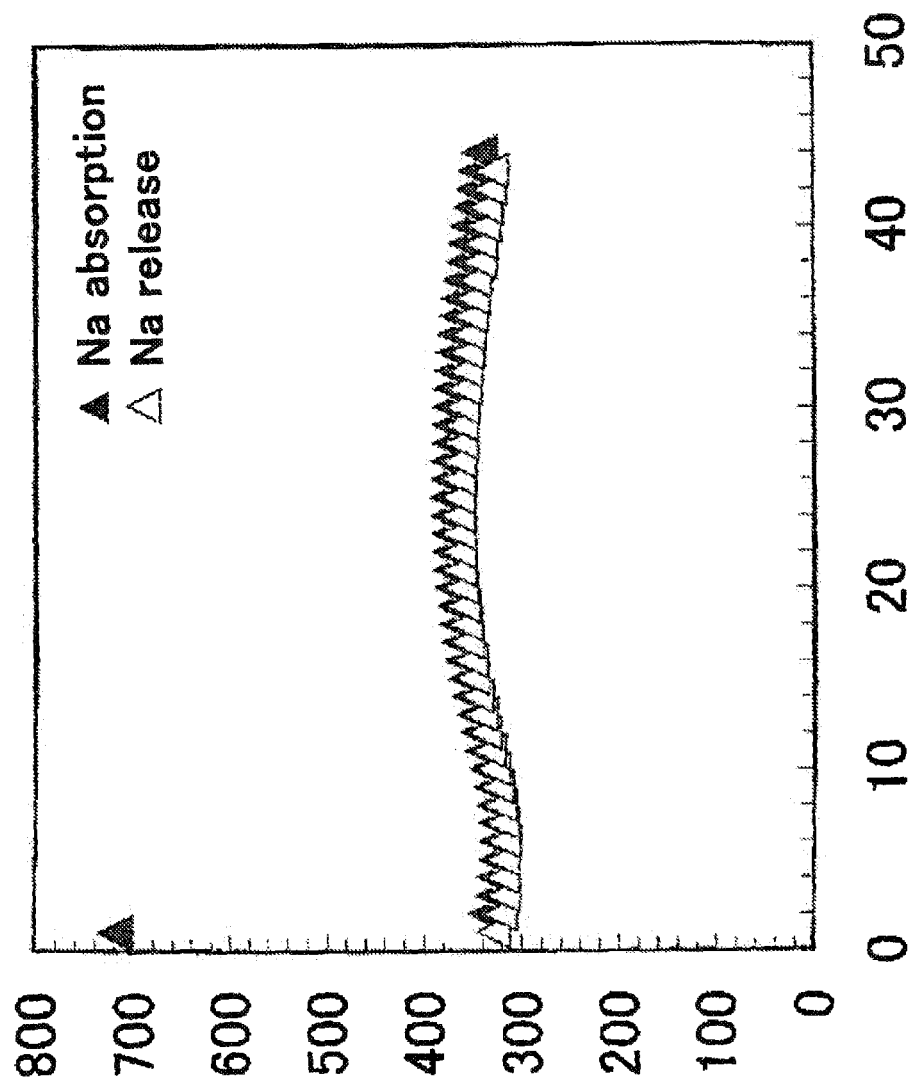
FIG. 12 is a graph showing the cycle life of Embodiment 9.
Figure 23:
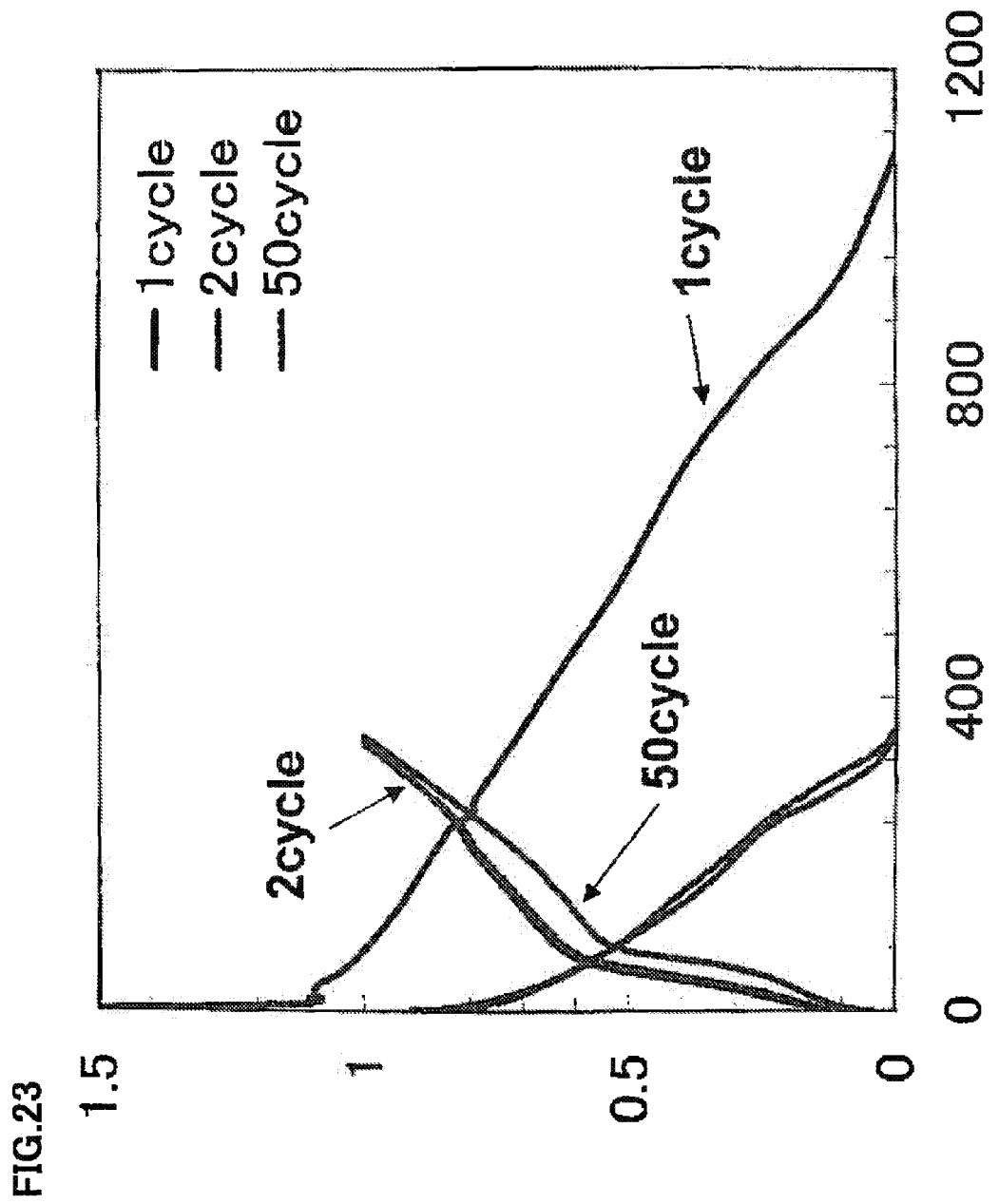
FIG. 23 is a graph of the charge and discharge curve of Embodiment 8-2.
Figure 24:
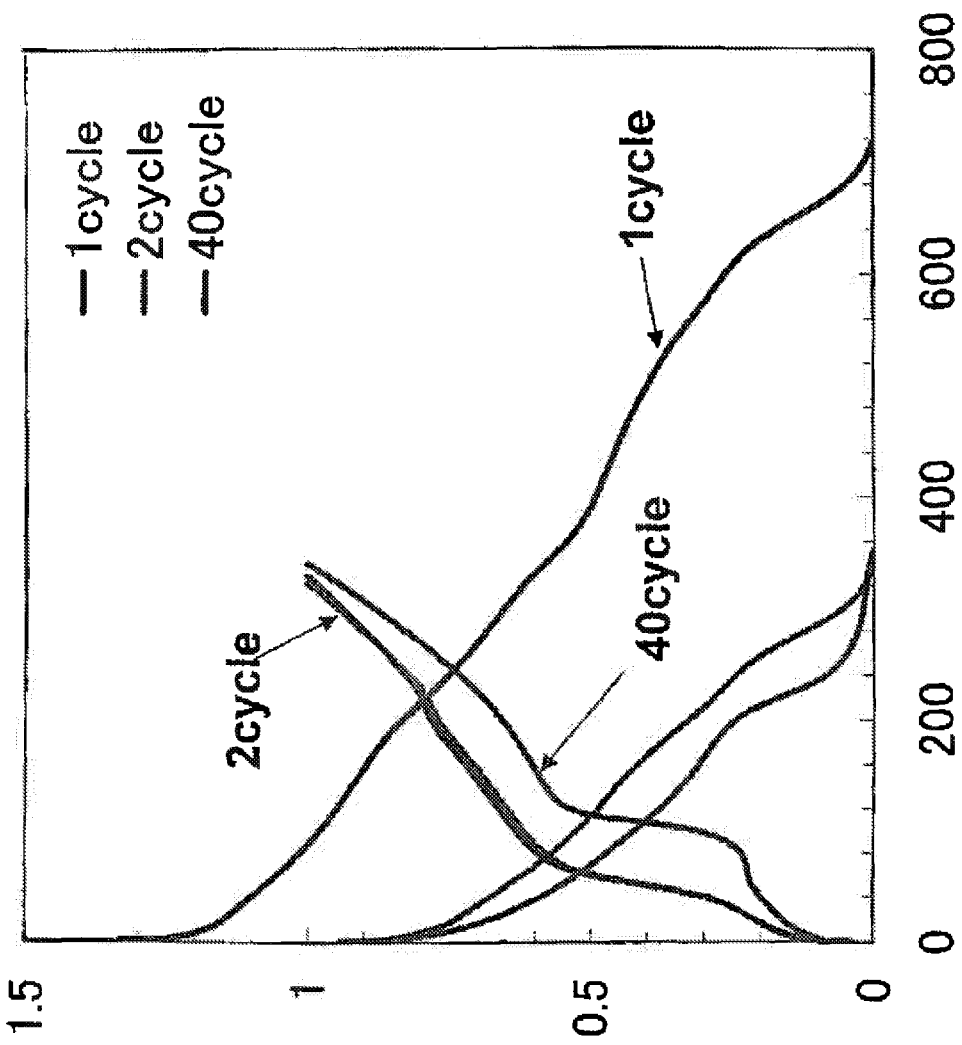
FIG. 24 is a graph of the charge and discharge curve of Embodiment 9.

(10) Embodiment 8-2 uses aluminum as a power collector to prevent the deterioration of the electrode in Embodiment 8-1, and it has a stable capacity of its active substance equal to or higher than 300 mAh/g over many cycles, and the capacity of its active substance only slightly deteriorates over 150 cycles of charge and discharge, and the deterioration of the power collector was not confirmed (see FIGS. 11 and 23).

(11) Embodiment 9 has its irreversible amount less than that of Embodiment 8. The reason thereof is supposedly because the amount of Sn in Embodiment 9 was larger than that of Embodiment 8. In addition, when the amount of Sn was increased, a multi-stage plateau of the capacity of the active substance became obvious (see FIGS. 12 and 24).

Figure 13:
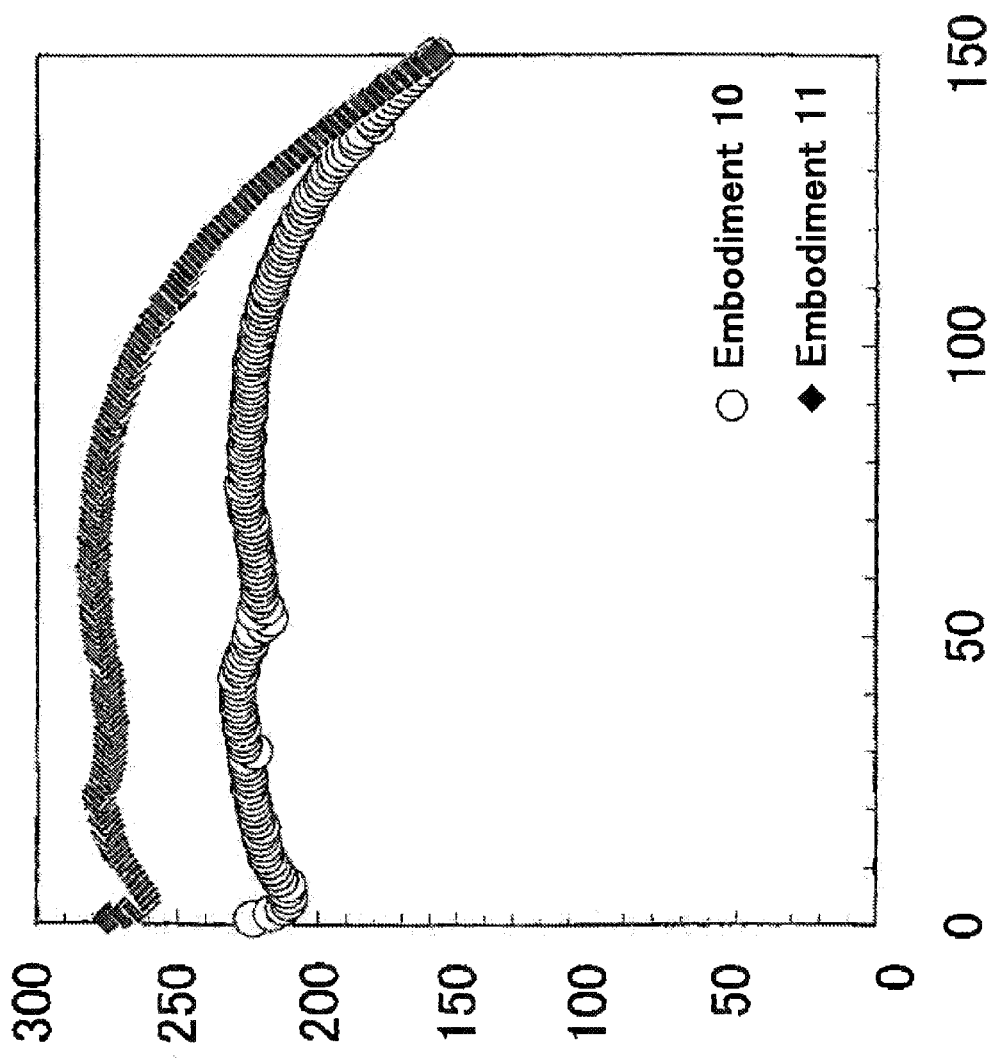
FIG. 13 is a graph showing the cycle lives of Embodiments 10 and 11.
Figure 14:
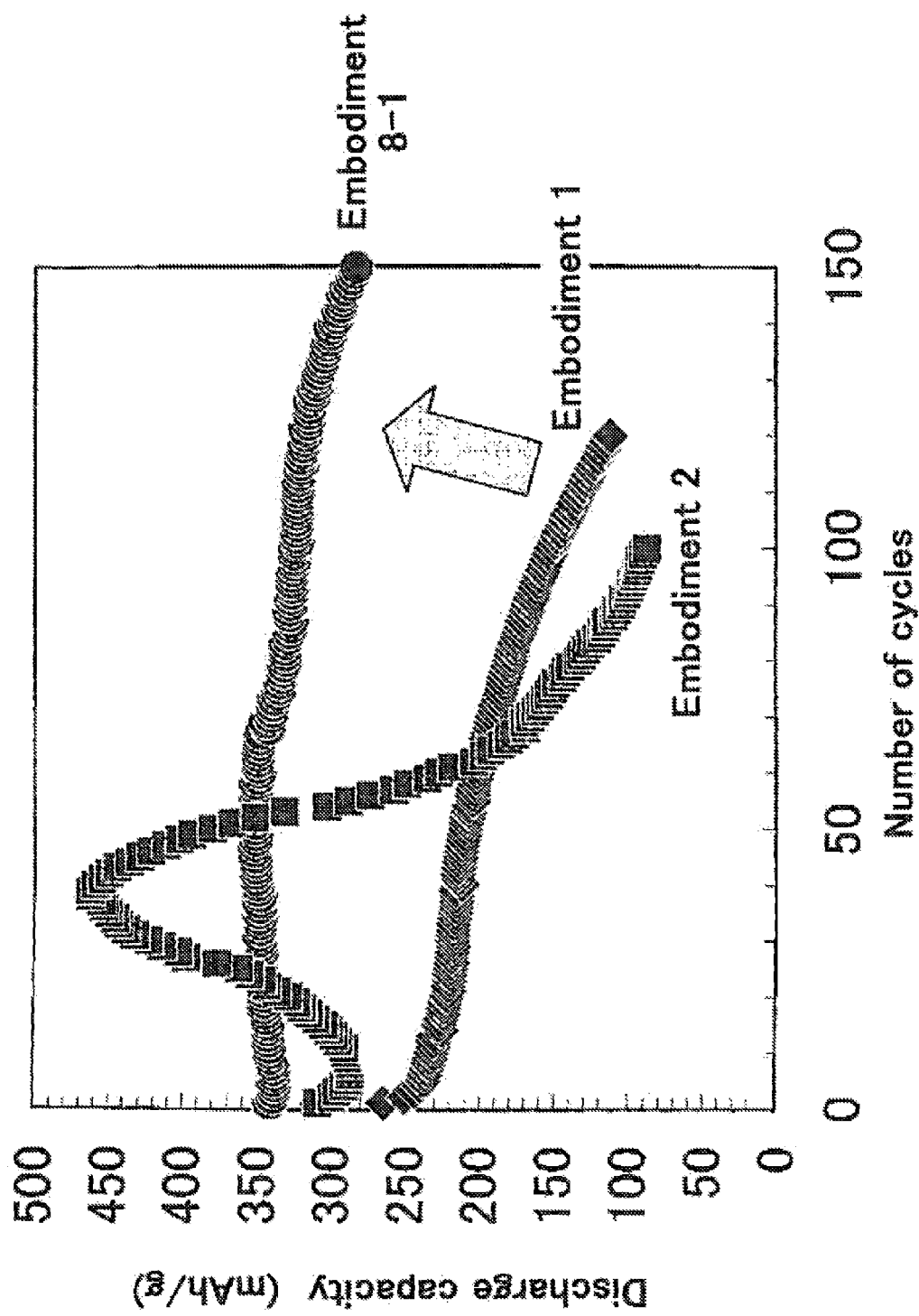
FIG. 14 is a graph showing the cycle lives of Embodiments 1 and 8-1, and Reference Example 2.

(12) Embodiments 10 and 11 have low capacities of about 200 mAh/g and about 250 mAh/g, respectively, but their cycle life characteristics are stable, and are better than the cycle life characteristics of the case where only Sn was used (Reference Example 1) (see FIG. 13).

As can be seen from (1) to (12), a sodium secondary battery using sulfide, etc. (Embodiments 1 to 5) according to the present invention as negative electrode material has better cycle life characteristics than the case where Sn is used as a negative active substance, and its cycle life characteristics can further improve when Ge is included in the negative material. When the sulfide, etc. make a composite with an other component(s) (Sn, SnS, Ge, etc.) (Embodiments 6-10), the capacity of the active substance increases, and the sodium secondary battery can have excellent cycle characteristics while maintaining high discharge capacity.

Application of Secondary Battery

A secondary battery using a negative electrode for a sodium secondary battery according to the present invention has high energy density and good cycle life characteristics. Accordingly, it can not only be used as a power source for electric power tool, automobile and the like, but can also be used in applications of electric equipment, electric product, vehicle and the like. In addition, it can also be used as a back-up power source. As electric equipment, electric products and vehicles, for example, there are air conditioner, washing machine, television, refrigerator, freezer, cooling apparatus, laptop computer, computer keyboard, personal computer (PC) display, desktop PC, notebook computer, CRT monitor, PC rack, printer, integrated PC, mouse, hard disk, PC peripheral, iron, clothes dryer, window fan, transceiver, blower, ventilation fan, TV, music recorder, music player, oven, cooking range, toilet seat having washing function, warm air heater, car audio system, car navigation system, flashlight, humidifier, portable karaoke machine, ventilation fan, dryer, battery, air cleaner, mobile phone, emergency light, game machine, blood pressure monitor, coffee mill, coffee maker, kotatsu (small table with an electric heater underneath and covered by a quilt), copy machine, disc changer, radio, shaver, juicer, shredder, water purifier, lighting equipment, dehumidifier, dish dryer, rice cooker, stereo, stove, speaker, trouser presser, vacuum cleaner, body fat scale, weight scale, bathroom scale, movie player, electric carpet, electric rice cooker, rice cooker, electric razor, electric desk light, electric kettle, game console, portable game console, electronic dictionary, electronic organizer, microwave oven, electromagnetic cooker, calculator, electric cart, electric wheelchair, power tool, electric toothbrush, electric foot warmer, haircut equipment, phone, clock, intercom, air circulator, electric bug killer, copy machine, hot plate, toaster, hair dryer, electric drill, water heater, panel heater, grinder, soldering iron, sewing machine, video camera, video cartridge recorder, fax machine, fan heater, food processor, futon dryer, headphone, electric kettle, electric carpet, microphone, massage machine, miniature light bulb, mixer, sewing machine, rice cake making machine, floor heating panel, lantern, remote controller, cool-maintaining equipment, water cooler, refrigeration stocker, cold air unit, word processor, whipping tool, electronic musical instrument, motorbike, toy, lawn mower, electric float, bicycle, automobile, hybrid automobile, electric automobile, rail, ship, airplane, emergency storage battery and the like.

INDUSTRIAL APPLICABILITY

A negative electrode for a sodium secondary battery obtained by the present invention has good cycle life characteristics with high capacity, and a sodium secondary battery using this can be endurable for practical use. In addition to the fact that sodium is cheap and is an element easy to obtain with no uneven regional distribution unlike lithium resource, a cheap aluminum foil can be used as a power collector of negative electrode for a sodium ion battery. Therefore, if the sodium ion battery can replace a lithium ion battery which is currently a mainstream of second battery, it is possible to manufacture a secondary battery at a cheaper cost than heretofore. Accordingly, the present invention greatly contributes to a further growth of the secondary battery market.

What is claimed is:

1. A negative electrode material for a sodium secondary battery comprising a composite powder of component A and component B,
   wherein (1) the component A is a material capable of electrochemically absorbing and releasing sodium; and
   (2) the component B is a sulfide or a sulfide composite body including sulfur, antimony, and the following component(s) of (i):

(i) at least one or more element(s) selected from a group consisting of Sn, As, Bi, Ge, Ga, Pb, and C, wherein a ratio of the sulfur, the antimony, and the component(s) of (i) is sulfur: 10 to 70 mol %, antimony: 10 to 70 mol %, and (i): 3 to 60 mol %.

2. The negative electrode material according to claim 1, wherein the composite powder is a composite powder with a surface of the component A coated with the component B.

3. The negative electrode material according to claim 2, wherein a ratio of the component A and the component B of the entire composite powder is the component A: 40 to 95 mass %, and the component B: 60 to 5 mass %, given that a total amount of both is 100 mass %.

4. The negative electrode material according to claim 1, wherein a ratio of the component A and the component B of the entire composite powder is the component A: 40 to 95 mass %, and the component B: 60 to 5 mass %, given that a total amount of both is 100 mass %.

5. A negative electrode for a sodium secondary battery including the negative electrode material according to claim 1.

6. The negative electrode of claim 5, wherein the sulfide composite body includes sulfide glass, and includes 0.5 to 40 mol % of Ge.

7. The negative electrode according to claim 6, wherein the negative electrode includes a polyimide binder.

8. The negative electrode according to claim 5, wherein the negative electrode includes a polyimide binder.

9. The negative electrode material according to claim 1, wherein the sulfide composite body includes sulfide glass, and includes 0.5 to 40 mol % of Ge.

10. The negative electrode material of claim 1, wherein component B includes Sn.

11. A sodium secondary battery including the negative electrode according to claim 5.

12. The sodium secondary battery according to claim 11, wherein an electrolyte has an $NaPF_6$ dissolved in a mixed solvent, and the mixed solvent includes a main solvent containing ethylene carbonate and a sub solvent containing one or more solution(s) selected from propylene carbonate, ethyl methyl carbonate, dimethyl carbonate, and diethyl carbonate.

13. A negative electrode material for a sodium secondary battery comprising a composite powder of component A and component B, wherein (1) the component A is a material capable of electrochemically absorbing and releasing sodium; and (2) the component B is sulfide or sulfide composite body including sulfur and antimony wherein the composite powder is a composite powder with a surface of the component A coated with the component B.

14. The negative electrode material according to claim 13, wherein a ratio of the component A and the component B of the entire composite powder is the component A: 40 to 95 mass %, and the component B: 60 to 5 mass %, given that a total amount of both is 100 mass %.

15. A negative electrode including the negative electrode material according to claim 13, wherein a weight ratio of the component A to the component B of the entire composite powder is from 40:60 to 95:5;

the sulfide composite body includes sulfide glass, and includes 0.5 to 40 mol % of Ge; and the negative electrode has a binder including a polyvinylidene fluoride, a polytetrafluoroethylene, a polyimide, a polyamide, a polyamide-imide, a polyacryl, a styrene-butadiene rubber, a styrene-ethylene-buthylene-styrene copolymer, a carboxymethylcellulose, a polyacrylic, a PVA, a PVB, or an EVA.

16. A method of manufacturing a negative electrode material for a sodium secondary battery comprising a composite powder of component A and component B, wherein;

(1) the component A is a material capable of electrochemically absorbing and releasing sodium; and (2) the component B is the sulfide or the sulfide composite body including sulfur, antimony, and the following component(s) of (i):

(i) at least one or more element(s) selected from a group consisting of Sn, As, Bi, Ge, Ga, Pb, and C, wherein a ratio of the sulfur, the antimony, and the component(s) of (i) is sulfur: 10 to 70 mol %, antimony: 10 to 70 mol %, and (i): 3 to 60 mol %, the method comprising the steps of:

step (A) obtaining the component B by preparing a material of the component B and by making a solid solution of the prepared material through heat treatment at a temperature of 400 to 1100° C.; and step (B) making a composite of the component A and the component B.

17. The method according to claim 16, wherein the step (B) is a step of making a composite of the component A and the component B through mechanical milling.

18. The method according to claim 16, wherein the step (B) is a step of dispersing the component A in the melted component B and crushing it after cooling.

19. The method according to claim 16, wherein a conductive aid and/or binder is added during the step (A) and/or step (B) and thus the conductive aid and/or binder is included in the composite powder.

20. The method of claim 16 wherein:

the heat treatment is for a time of 1 to 30 hours;

a weight ratio of the component A to the component B of the entire composite powder is from 40:60 to 95:5;

a conductive aid and/or binder is added during the step (A) and/or step (B) and thus the conductive aid and/or binder is included in the composite powder; and the sulfide composite body includes sulfide glass, and includes 0.5 to 40 mol % of Ge.

* * * * *

UNITED STATES PATENT AND TRADEMARK OFFICE
CERTIFICATE OF CORRECTION

PATENT NO. : 9,553,308 B2
APPLICATION NO. : 14/355252
DATED : January 24, 2017
INVENTOR(S) : Koichiro Ikeda et al.

It is certified that error appears in the above-identified patent and that said Letters Patent is hereby corrected as shown below:

On the Title Page

At Item (54) and in the Specification, at Column 1, Lines 1-6 Title:

Delete "NEGATIVE ELECTRODE MATERIAL FOR SODIUM SECONDARY BATTERY AND METHOD FOR PRODUCING SAME NEGATIVE ELECTRODE FOR SODIUM SECONDARY BATTER AND SODIUM SECONDARY BATTERY"

Insert --NEGATIVE ELECTRODE MATERIAL FOR SODIUM SECONDARY BATTERY AND METHOD FOR PRODUCING SAME NEGATIVE ELECTRODE FOR SODIUM SECONDARY BATTERY AND SODIUM SECONDARY BATTERY--

Signed and Sealed this
Second Day of May, 2017

Michelle K. Lee
*Director of the United States Patent and Trademark Office*